US007216199B2

(12) United States Patent
Mizuno

(10) Patent No.: US 7,216,199 B2
(45) Date of Patent: May 8, 2007

(54) DISK CONTROL SYSTEM AND METHOD

(75) Inventor: Satoshi Mizuno, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1082 days.

(21) Appl. No.: 09/954,303

(22) Filed: Sep. 18, 2001

(65) Prior Publication Data
US 2002/0091903 A1    Jul. 11, 2002

(30) Foreign Application Priority Data
Jan. 9, 2001    (JP)    ............................ 2001-001137

(51) Int. Cl.
*G06F 12/00*    (2006.01)
(52) U.S. Cl. ...................... 711/114; 711/113; 711/206; 711/157; 711/4
(58) Field of Classification Search ................ 711/114, 711/113, 206, 157, 4; 714/100, 1, 2
See application file for complete search history.

(56) References Cited

U.S. PATENT DOCUMENTS

| | | | | |
|---|---|---|---|---|
| 6,049,891 | A | * | 4/2000 | Inamoto ........................ 714/6 |
| 6,134,586 | A | * | 10/2000 | Walker .......................... 725/87 |
| 6,223,300 | B1 | * | 4/2001 | Gotoh ........................... 714/5 |
| 6,883,031 | B1 | * | 4/2005 | Hurley et al. ................ 709/227 |

| | | | |
|---|---|---|---|
| 2002/0083281 | A1 | * | 6/2002 | Carteau ..................... 711/161 |

FOREIGN PATENT DOCUMENTS

| | | |
|---|---|---|
| JP | 4-127224 | 4/1992 |
| JP | 6-214720 | 8/1994 |
| JP | 11-53235 | 2/1999 |

OTHER PUBLICATIONS

Kazunori Sekido et al., "RAID BOOSTER™ RAID Acceleration Technology", Toshiba Review, vol. 54 No. 12, pp. 13-17, 1999.
Satoshi Mizuno, "Disk Control System and Data Rearrangement Method", U.S. Appl. No. 09/662,220, filed Sep. 12, 2000.

* cited by examiner

*Primary Examiner*—Kimberly McLean-Mayo
(74) *Attorney, Agent, or Firm*—Finnegan, Henderson, Farabow, Garrett & Dunner, L.L.P.

(57) ABSTRACT

In a disk control system having a RAID controller for continuously writing data on a data stripe composed of a plurality disk apparatus, in response to a write request, data blocks are sequentially written on empty areas of a write target data stripe on the plurality of disks in such a manner that at least one data block is written at a time. Further, in response to the write request, logical addresses having address values prior to address translation are written on logical address log areas on the plurality of disks, as logical-address log information. An upper file system is notified that the write has been completed after the data and the logical-address log information have been completely written.

29 Claims, 13 Drawing Sheets

(1) Req1=(4KB, 100)
(2) Req2=(6KB, 76)
(3) Req3=(2KB, 60)
(4) Req4=(8KB, 79)
FIG. 10A
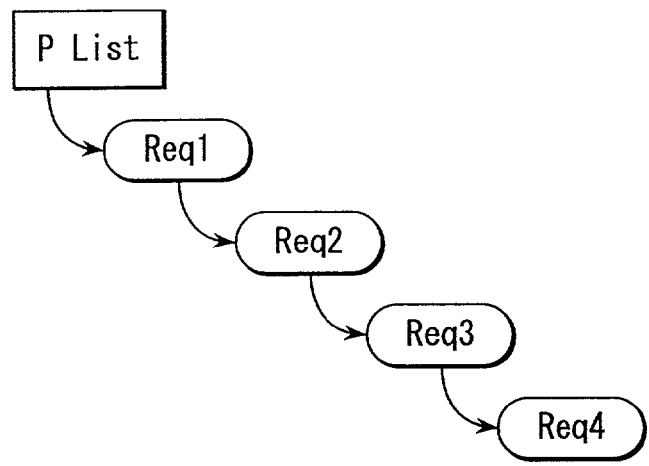
FIG. 10B
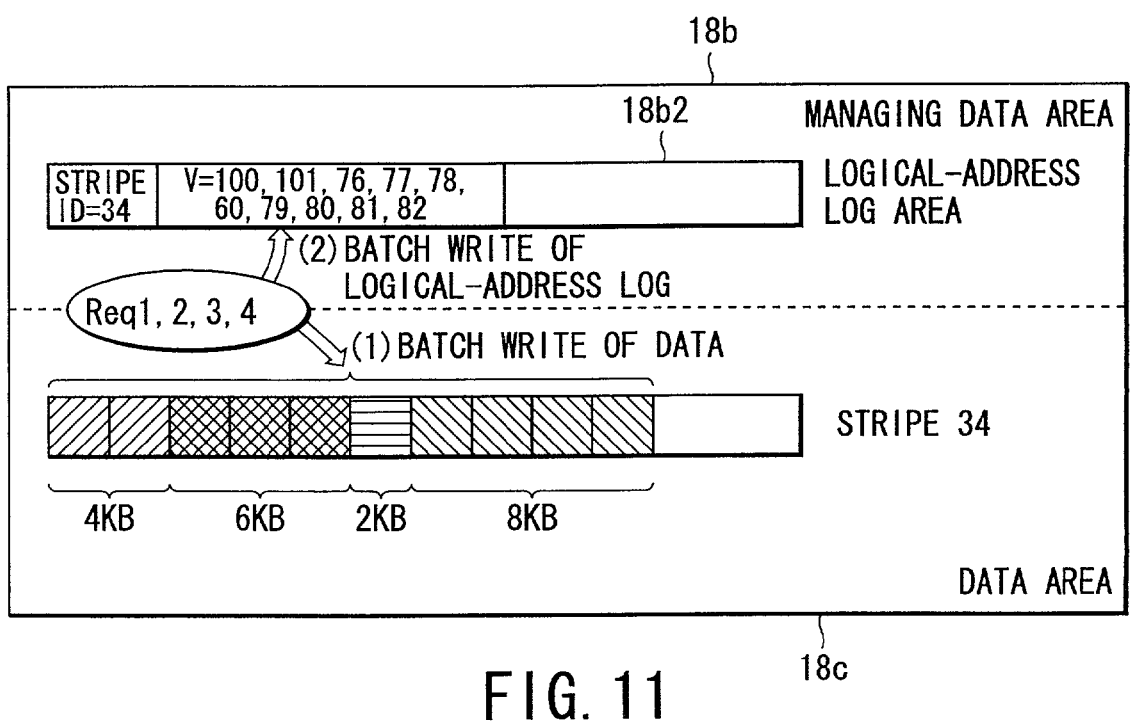
FIG. 11

LA 0 | Valid=0 STRIPE ID=157 TS= | . . .

LA 1 | Valid=1 STRIPE ID=31 TS= 11680 | . . .

| | | E0 | E1 | E2 | |
| LA 2 | Valid=1 STRIPE ID=34 TS= 11679 | TS=11679 V=463, 464 CS=CS0, CS1 | TS=11679 V=27, 28, 29 CS=CS2, CS3, CS4 | TS=11677 V=231, 232 CS=CS5, CS6 | |

LA 3 | Valid=0 STRIPE ID=2513 TS= 11678 | . . .

DISK CONTROL SYSTEM AND METHOD

CROSS-REFERENCE TO RELATED APPLICATIONS

This application is based upon and claims the benefit of priority from the prior Japanese Patent Application No. 2001-001137, filed Jan. 9, 2001, the entire contents of which are incorporated herein by reference.

BACKGROUND OF THE INVENTION

1. Field of the Invention

The present invention relates to a disk control system and method, and in particular, to a disk control system and method that continuously writes write-requested data to a stripe on a disk using only a main memory and a disk apparatus and without using any exclusive non-volatile memory constituting a write buffer and an address mapping table and which is conventionally used for a RAID control device.

2. Description of the Related Art

A method of writing all data to a physical stripe as one continuous area of random writes as shown, for example, in Jpn. Pat. Appln. KOKAI Publication No. 6-214720 and Jpn. Pat. Appln. KOKAI Publication No. 11-53235 has been proposed as a write method for a disk control system of a RAID configuration. In the prior art, however, write data are written to a nonvolatile memory (hereinafter referred to as an "NvRAM") or a volatile memory, and once write data amounting to one stripe have been provided, they are written to the physical stripe on the disk apparatus. Further, the NvRAM stores an address mapping table in which logical addresses from an upper file system are translated into physical addresses on the disk.

When the data are thus written to the NvRAM, even if the system is shut down before the data are written to the disk apparatus, the write can be completed by referencing the NvRAM after system reboot and correctly writing the data in the NvRAM which have not been written yet, to the disk apparatus (no write data are lost).

That is, as long as the data write to the NvRAM has been completed, no write data are lost. Thus, once the write data have been written to the NvRAM, the conventional disk control apparatus notifies, in response to the write request, the host that the write has been "completed".

The NvRAM, however, must be provided in an I/O card (hardware) installed in the system, thus disadvantageously requiring corresponding costs. Other problems include the compatibility of the system with a host computer or other equipment, the needs for maintenance, and the like.

BRIEF SUMMARY OF THE INVENTION

It is an object of the present invention to provide a disk control system and method that continuously writes write-requested data to a stripe on a disk using only a main memory and a disk apparatus and without using any NvRAM.

To achieve this object, the present invention provides a disk control system that responds to a write request from an upper file system to translate logical addresses into physical ones and then continuously write write-requested data to a data stripe as a write area composed of a plurality of disk apparatuses, the system being characterized by comprising means for responding to the write request to sequentially write data blocks to an empty area of an assigned target data stripe of data areas provided on the plurality of disks, in such a manner that at least one data block is written at a time, means for responding to the write request to write the logical addresses from the upper file system to data managing areas provided on the plurality of disks, as logical-address log information, and means for notifying, in response to the write request from the upper file system, the upper file system that the write has been completed, after the data and the logical-address log information have been completely written.

According to this aspect of the present invention, instead of the non-volatile memory, a data managing area $18b$, a data area $18c$, and the like provided on the disk can be used to process the request as writes to an area in which random writes are physically contiguous to one another. Thus, the adverse effects of seeking and rotation waiting operations are reduced, thereby achieving a fast write process without using any non-volatile memory.

Further, the present invention provides a disk control system that responds to a write request from an upper file system to translate logical addresses into physical ones and then continuously write write-requested data to a data stripe as a write area composed of a plurality of disk apparatuses, the system being characterized by comprising means for writing a plurality of block data corresponding to a plurality of write requests, to a write buffer provided in a main memory, data write means for responding to the plurality of write requests to simultaneously write all the plurality of data blocks stored in the write buffer to an empty area of an assigned target data stripe of data areas provided on the plurality of disks, log write means for simultaneously writing the logical addresses from the upper file system corresponding to the plurality of block data, to data managing areas provided on the plurality of disks, as logical-address log information, and means for notifying, in response to the write requests from the upper file system, the upper file system that the writes have been completed, after the data and the logical-address log information have been completely written.

According to this aspect of the present invention, instead of the non-volatile memory, the data managing area $18b$, the data area $18c$, and the like provided on the disk can be used to process the request as writes to an area in which random writes are physically contiguous to one another. Further, the plurality of write requests can be processed as one data write process and one write of the logical-address log information, thereby reducing the number of write processes required and increasing a write size. Consequently, the total overhead of the writes to the disk decreases to thereby improve the throughput of the write process.

Moreover, the present invention provides a disk control system that responds to a write request from an upper file system to translate logical addresses into physical ones and then continuously write write-requested data to a data stripe as a write area composed of a plurality of disk apparatuses, the system being characterized by comprising means for responding to the write request to sequentially write data blocks to an empty area of an assigned target data stripe of data areas provided on the plurality of disks, in such a manner that at least one data block is written at a time, means for responding to the write request to write the logical addresses from the upper file system, write data sizes, and checksums of data written to logical-address area provided on the plurality of disks, as logical-address log information, and means for notifying, in response to the write request from the upper file system, the upper file system that the write has been completed, after the data and the logical-address log information have been completely written.

According to this aspect of the present invention, if the system fails during a write to the data area of the disk, it is checked whether or not a checksum value being written to the logical-address log area of a stripe being subjected to the write process equals a checksum value determined from data from the data area. If these checksum values are equal, it is determined that the data write has been completed. Accordingly, the data are treated as valid, and the remaining part of the process (registration in the address mapping table and the like) is executed, thus enabling an efficient troubleshooting process.

Further, the present invention provides a disk control system that responds to a write request from an upper file system to translate logical addresses into physical ones and then continuously write write-requested data to a data stripe as a write area composed of a plurality of disk apparatuses, the system being characterized by comprising means for responding to the write request to write the logical addresses from the upper file system, write data sizes, and checksums of data written to logical-address areas provided on the plurality of disks, as logical-address log information, means for responding to the write request to sequentially write data blocks to an empty area of an assigned target data stripe of data areas provided on the plurality of disks, in such a manner that at least one data block is written at a time, and means for notifying, in response to the write request from the upper file system, the upper file system that the write has been completed, after the data and the logical-address log information have been completely written.

According to this aspect of the present invention, for each write request, once the logical-address log information and the write data a have been completely written to the logical-address log area, an OS file system can be notified that the writes have been completed. That is, the apparatus can respond to the OS file system quickly.

Moreover, the present invention provides a disk control system that responds to a write request from an upper file system to translate logical addresses into physical ones and then continuously write write-requested data to a data stripe as a write area composed of a plurality of disk apparatuses, the system being characterized by comprising means for responding to the write request to record flags indicative of validity or invalidity, stripe ID numbers, and write time stamps for final data in header sections of logical address log areas provided on the plurality of disks, and write time stamps for at least one block data processed by the write request, at least one logical address, and at least one checksum to entry sections of the logical-address log areas as logical-address log information, means for responding to the write request to sequentially write data blocks to an empty area of an assigned target data stripe of data areas provided on the plurality of disks, in such a manner that at least one data block is written at a time, and means operative if the system fails during the write, to check whether or not a checksum value being written to the logical-address log area of a stripe being subjected to the write process and for which a valid flag has been set equals a checksum value determined from data from the data area, and to treat the data as valid if these checksum values are equal, while determining that the write has not been completed and discarding the data if these checksum values are unequal.

According to this aspect of the present invention, if the system fails during a write, it is checked whether or not a checksum value being written to the logical-address log area of a stripe being subjected to the write process and for which a valid flag has been set equals a checksum value determined from data from the data area. If these checksum values are equal, the data are treated as valid. If the checksum values are not equal, it is determined that the write has not been completed, and the data are discarded, thus enabling an efficient troubleshooting process.

According to this aspect of the present invention, in a disk system employing a log-type data block managing system, the write address information from the file system is written to the fixed area on the disk, so that a cache of a RAID controller can be effectively used to reduce the time required for writes. By introducing the checksum into the management of the address mapping table, its consistency can be checked after a troubleshooting process or the like following an unexpected system down, thereby making the system more reliable.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with general description given above and the detailed description of the embodiments given below, serve to explain the principles of the invention.

FIGS. 10A and 10B illustrate a diagram showing the organization of write requests Reqi and how the requests are stored in a pending list, according to the third embodiment of the present invention;

FIG. 11 is a diagram showing a data stripe and a write to a logical-address log area according to the third embodiment of the present invention;

DETAILED DESCRIPTION OF THE INVENTION

First, various terms used herein will be described.

(Data Stripe)

The term "data stripe" means a unit of data "collectively written" by a disk control system (this operation is also referred to as a "batch write"). The data stripe is a continuous area on disk partitions and has a size equal to an integral multiple of the size of a stripe managed by a RAID controller. For the RAID5 configuration, this size can be set as a parity group to correct what is called "RAID5 write penalty", thus substantially improving the performance of the system. The stripe is composed of a plurality of data blocks.

(Stripe Number)

The term "stripe number" means the serial numbers of the physical strips arranged on the partitions.

(Logical Block Number=Logical-Address Number)

The term "logical block number" refers to data block numbers on the partitions as viewed from an upper file system. In a disk control system, when the upper file system requests an access, it uses logical block numbers, which are virtual. The logical block numbers are associated with physical block numbers (arranged on the physical partitions) by an "address mapping table" managed by the disk control system. A byte offset value (address) on the partition is determined on the basis of (physical block number)×(block size [bytes]).

(Address Mapping Table (AMT))

In the disk control system, when the upper file system requests an access, it uses logical block numbers, which are virtual. The logical block numbers are associated with the physical block numbers (arranged on the physical partitions) by the "address mapping table", managed by the disk control system. In the embodiments of the present invention, the address mapping table is located on a target partition and is assigned with an area different from data sections. The address mapping table has the physical block numbers registered therein, which correspond to the logical block numbers. When a new data block is to be written, the physical block number (address on the disk) to which that block is written is registered in the entry of the corresponding logical block number. On the other hand, when a data block is to be referenced, the value of the entry having the logical address of that data block as an index is determined and used as a physical block number on the disk to determine an actual address for reference.

An embodiment of the present invention will be described below with reference to the drawings.

Figure 1:
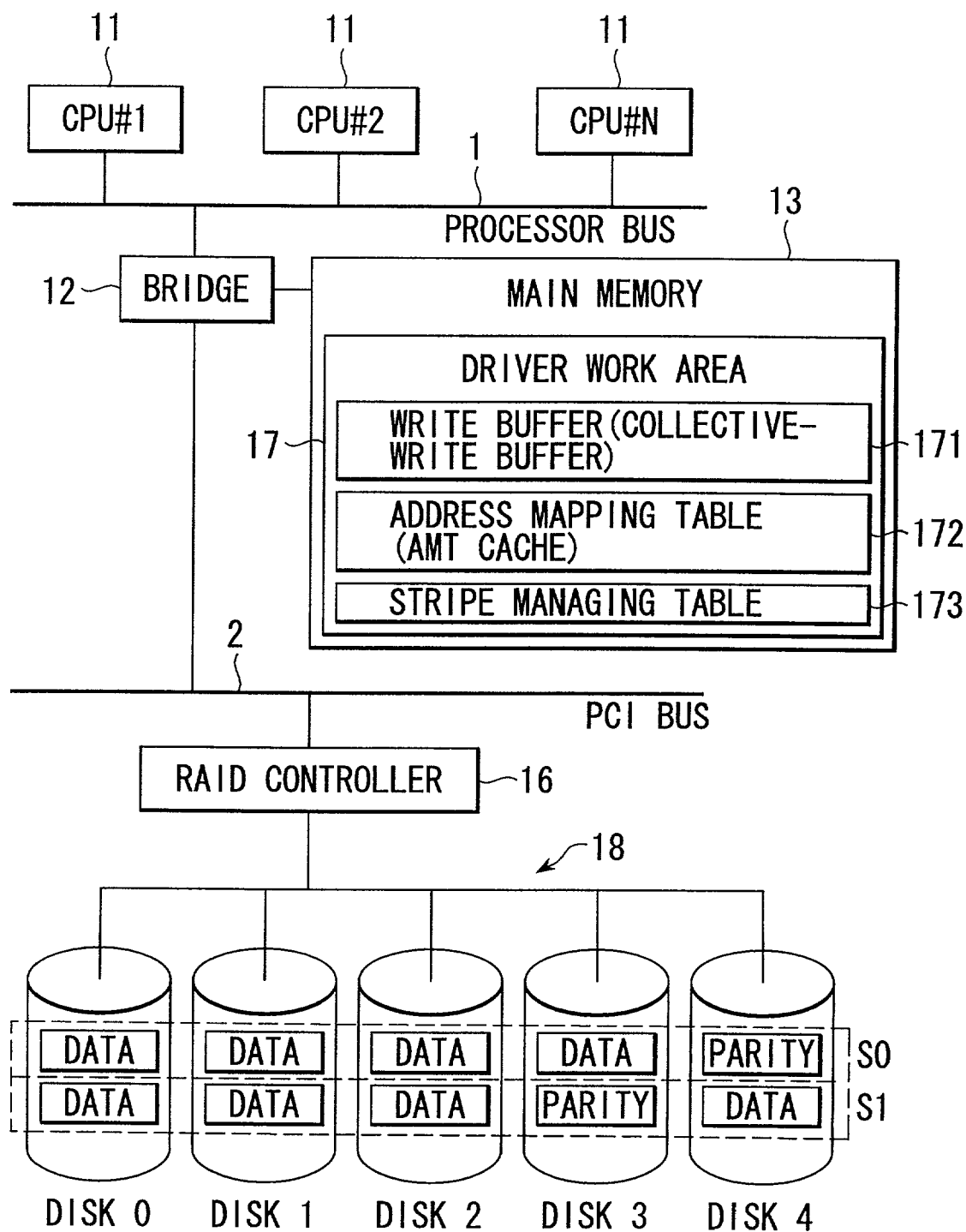
FIG. 1 is a block diagram showing the configuration of a computer system to which a disk control system of the present invention has been applied.

FIG. 1 shows the configuration of a computer system to which a disk control system according to one embodiment of the present invention has been applied. This computer system is used, for example, as a server (PC server) that can have a plurality of CPUs (#1, #2, and #N) 11 mounted therein. These CPUs 11 are connected to a bridge 12 via a processor bus 1 as shown in the figure. The bridge 12 is a bridge LSI for connecting the processor bus 1 and a PCI bus 2 for bidirectional communications, and has a built-in memory controller for controlling a main memory 13. The main memory 13 has an operating system (OS), an application program to be executed, a driver, and the like loaded therein. Further, in the present invention, the main memory 13 has a driver work area 17 provided with a write buffer (collective-write buffer) 171, an address mapping table (hereinafter referred to as an "AMT cache") 172, and a stripe managing table 173.

The write buffer 171 is a data buffer for accumulating write data blocks therein. Once, for example, write data blocks amounting to one physical stripe have been accumulated in the write buffer 171, a batch write to the disk array 18 is started. The present invention, however, is not limited to this operation. If a collective write is to be executed, the physical stripe will be a unit of "collective write" and will be composed of a series of contiguous areas on partitions formed in the entire storage area of the disk array 18. Each physical stripe has a size equal to an integral multiple of the size of a stripe unit managed by a RAID controller 16.

The AMT cache 172 stores address mapping information indicative of the correspondences between a plurality of logical block numbers constituting a logical address space and corresponding physical block numbers each indicative of a physical location on the disk array 18 in which the data block designated by the corresponding logical block number is present. When the OS file system requests an access, it uses logical block numbers, which are virtual. The logical block numbers are associated with the physical block numbers (arranged on the physical partitions) by the AMT cache 172. Further, a byte offset value from the leading location of the partition is determined on the basis of a physical block number×a block size (bytes).

Moreover, the AMT cache 172 has a plurality of entries corresponding to the respective logical block numbers. When a new data block is to be written, the physical block number (physical address) to which that block is actually written is registered in the entry corresponding to the write-requested logical block number. On the other hand, when a data block is to be read, a physical block number is determined from the entry corresponding to the read-requested logical block number, and a data block is read from the physical location on the disk partition designated by that physical block number (physical block number×block size).

The stripe managing table 173 manages information on the logical stripes, and this information is used for a process of relocating data and other processes.

The PCI bus 2 has a RAID controller 16 connected thereto. The disk array 18, composed of a plurality of disk apparatuses controlled by the RAID controller 16, is used for recording various user data and for other purposes.

The disk array 18 functions as a disk array of, for example, a RAID5 configuration under the control of the RAID controller 16. In this case, the disk array 18 is composed of N+1 (in this case, five (DISK0 to DISK4)) disk apparatuses including N for storing data and additional one for storing parities. These N+1 disk apparatuses are grouped and used as a single logical disk drive.

The grouped disk apparatuses are assigned with physical stripes (parity groups) each composed of data and their parity, and the parity of each physical stripe is sequentially shifted among the N+1 disk apparatuses. For example, the parity of a group of data on a physical stripe S0, assigned to the same location of the disks DISK0 to DISK3, is recorded on the corresponding stripe in the disk DISK4. Further, the parity corresponding to data on a physical stripe S1 is recorded on the corresponding stripe in the disk DISK3. By distributing the parities of the physical stripes among the N+1 disk apparatuses, accesses are prevented from concentrating on the parity disk.

The driver work area 17 of the main memory 13 is used to implement a RAID speed-up driver. The RAID speed-up driver is used to improve the performance of writes to the disk array 18. In this embodiment, the RAID speed-up driver is implemented using a driver program incorporated in the OS and the driver work area 17 and without modifying an OS file system 50. Then, the principle of the control of writes to the disk array 18 using the RAID speed-up driver will be described with reference to the drawings.

A RAID speed-up driver 100 is provided as a filter driver located between the OS file system 50 and the physical disks (disk array 18). The RAID speed-up driver 100 is responsive to a write request from the file system 50 to execute the functions of (1) carrying out address mapping to set a next empty area of a write target stripe as a write target physical address (address in the logical partitions on the RAID) and then carrying out an actual write, and (2) registering the write target address of the write request in the AMT cache 172.

The RAID speed-up driver 100 is responsive to the write request from the OS file system 50 to translate the requested logical addresses into physical ones using the AMT cache 172 and write transformed write data to a data stripe formed in the disk array 18 (this also applies to a series of write requests with discontinuous target addresses). A continuous area constituting contiguous addresses on the disk constituting this data stripe has an appropriate alignment and size to enable efficient writes to the disk. The alignment and size depend on a driver directly operating the disk and on the RAID controller 16. In particular, if the write target disk array 18 has the RAID 5 configuration, the continuous area corresponds to a "parity group" or its integral multiple.

With a write method using the RAID speed-up driver 100, instead of determining data write locations according to the logical addresses contained in the write requests from the host computer (in this embodiment, the OS file system 50), the write data are sequentially accumulated in the order designated in the write requests from the host computer to form a large data block composed of a plurality of write data blocks. Then, the large data block is collectively and sequentially written to an empty area of the disk array 18 from top to bottom. A unit of the "collective write" is a physical stripe. That is, one free physical stripe is generated for each "collective write", and the data blocks corresponding to one physical stripe are sequentially written to this physical stripe. Thus, random accesses can be converted into sequential ones to substantially improve the write performance. The present invention, however, is not limited to the above described "collective write", but the write process may be executed for each write request from the OS file system 50 or each group of a plurality of write requests.

Figure 2:
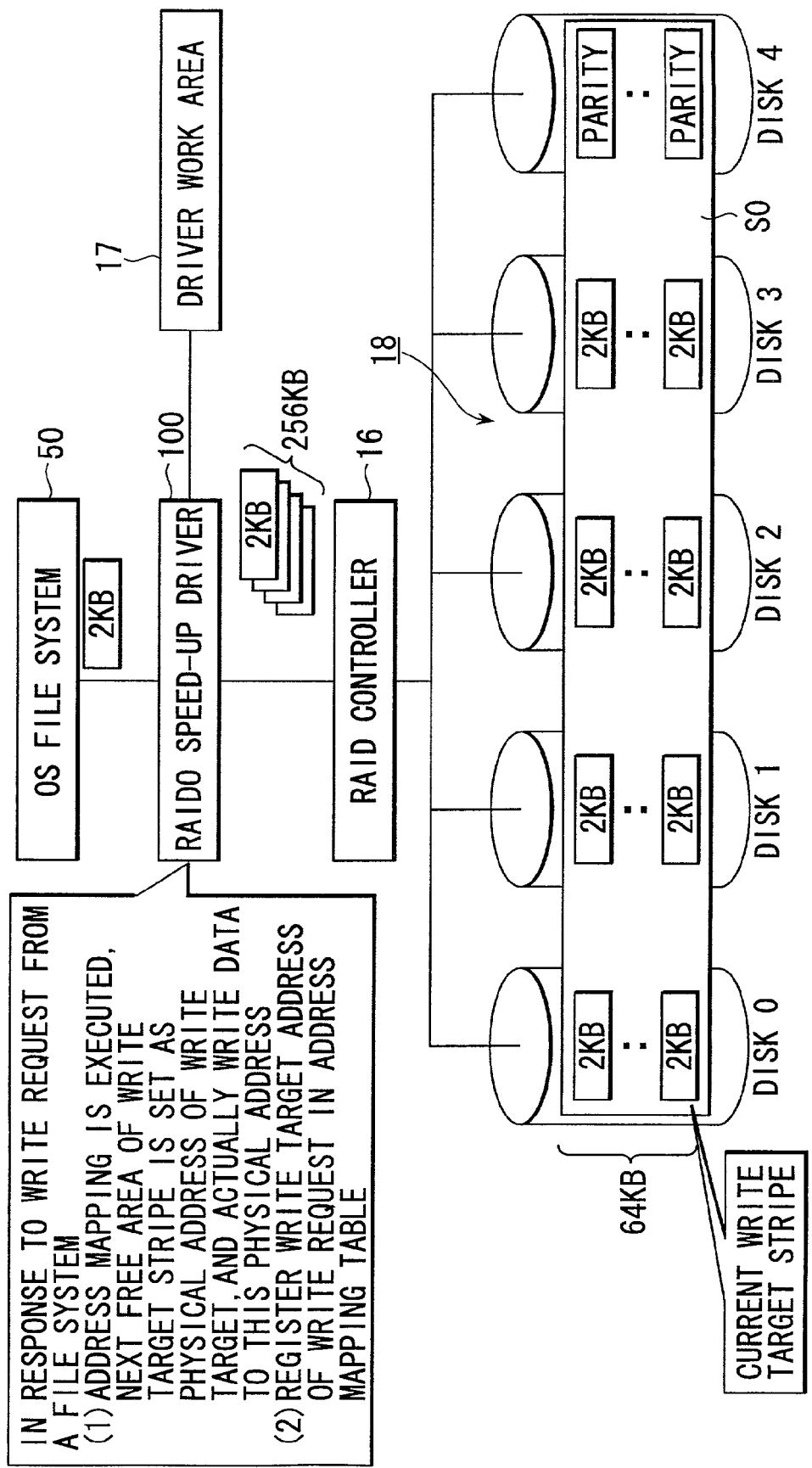
FIG. 2 is a block diagram showing the principle of the control of writes to a disk array using a RAID speed-up driver according to the present invention.

FIG. 2 shows a write operation based on the above described "collective write". This is an example where the block data size of write data transmitted by the OS file system 50 is 2 KB, the data size of one stripe unit is 64 KB, and the data size of one physical stripe (parity group) is 256 KB (64 KB×4). The 2-KB write data block is obtained by the RAID speed-up driver 100, incorporated in the OS, and is accumulated in the write buffer 171 in the driver work area 17 of the main memory 13.

Essentially, once 256 KB of data blocks (2 KB×128 data blocks) have been accumulated in the write buffer 171 in the driver work area 17, they are collectively written to one physical stripe in the disk array 18 at a time. In this case, the RAID controller 16 can generate a parity only from the 256 KB of write data blocks, thereby eliminating the needs for processes of, for example, reading old data in order to calculate the parity. Consequently, the well-known RAID5 write penalty can be reduced.

(First Variation of the Embodiment)

Now, an operation of executing a write to the disk array 18 using the RAID speed-up driver 100 will be described with reference to FIG. 3. This figure shows how the RAID speed-up driver 100 processes write requests Req1, Req2, Req3, Req4, . . . transmitted by the upper file system 50.

Figure 3:
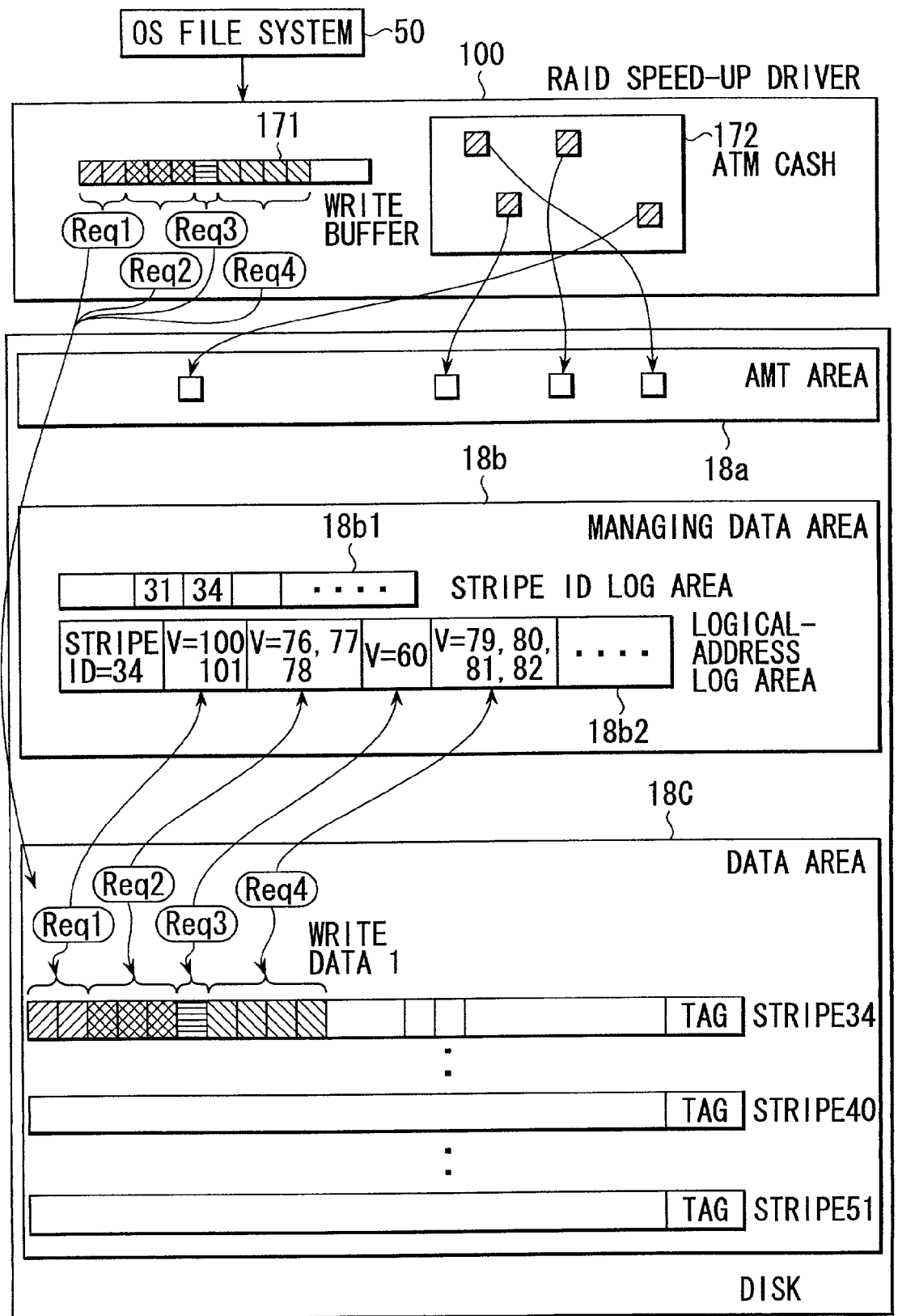
FIG. 3 is a block diagram showing the relationship between the RAID speed-up driver and the disk as well as the control of writes using the RAID speed-up driver according to a first embodiment of the present invention.

In FIG. 3, a write/reference process is shown to be executed on one disk, but a disk 180 in FIG. 3 is logical and a RAID configuration is actually used which is composed of a plurality of physical disks (DISK0 to DISK4) as shown in FIGS. 1 or 2. Then, the entire disk 180 constitutes one partition.

In FIG. 3, the partition of the disk 180 is divided into the address mapping table (hereinafter referred to as the "AMT area") 18*a*, a managing data area 18*b* composed of a stripe ID log area 18*b*1 and a logical-address log area 18*b*2, and a data area 18*c*.

For example, it is assumed that the physical data stripe corresponding to the current write target is a "stripe 34" in the data area 18*c*. Once write data have been assigned to all the areas of the write target data stripe 34, the RAID speed-up driver 100 assigns a new free stripe as the next write target. A subsequent write process for the write request data is executed on the areas of the newly assigned stripe.

In response to the write requests Req1, Req2, Req3, Req4, . . . from the OS file system 50, the RAID speed-up driver 100 writes the data stored in the write buffer 171 to the stripe 34 in the data area 18*c* of the disk 180, and registers the actual physical addresses that have undergone the writes, in the AMT cache 172. Further, in response to a read request from the OS file system 50, the RAID speed-up driver 100 references the AMT cache 172 to determine the physical address corresponding to a designated logical address, and returns data corresponding to the result of a read of that physical address from the disk 180, to the OS file system 50.

Each data stripe in the data area 18*c* has a "TAG area" TAG in the last block. When data is written to each stripe, (1) the times when corresponding writes were executed on that data stripe (or time stamps TS as sequence numbers for the writes) and (2) the logical addresses of valid data blocks of the data stripe are recorded and saved in the TAG area.

Further, during a write to a data stripe, the "logical address" of each of the data blocks written to the data stripe, currently undergoing the write, is recorded in the logical-address log area 18b2 of the managing data area 18b.

Moreover, the IDs of stripes selected as the write target data stripe are recorded in the stripe ID log area 18b1 of the managing data area 18b in a time series manner. This example shows that the stripe ID "31" underwent a write before the stripe ID "34".

FIG. 3 shows, in an upper part thereof, the driver work area 17, provided on the main memory 13. This figure shows that the area 17 includes sub-areas for the write buffer 171 and the AMT cache 172. The AMT cache 172 has part of the address mapping table, stored in the AMT area 18a, and is accessed during system operation. If an access is requested in connection with a logical address that is not registered in the AMT cache 172, a corresponding content is read from the address mapping table in the AMT cache 18a and registered in the AMT cache 172. If the contents of the AMT cache have been updated or the system is to be shut down, the contents of the AMT cache 172 are written back to the address mapping table in the AMT area 18a.

The write buffer 171 is an area in which relevant data are first buffered in response to a write request from the OS file system 50. One write buffer has a size equal to one data stripe, and FIG. 3 shows only one write buffer due to the limited space in the figure. A plurality of write buffers, however, are provided. In the first variation of the embodiment, the write buffer 171 is not necessarily required. For example, a buffer memory may be provided which stores one or more data blocks.

The AMT cache 172 is an area in which the address mapping table in the AMT area 18a on the disk is cached and stored. To reference or change the AMT cache 172, the RAID speed-up driver 100 loads data from the AMT area 18a into the AMT cache 172 in such a manner that a predetermined fixed size of data (for example, 4 KB) are loaded at a time, and references or changes them on the main memory 13. If the cached AMT cache 172 has been changed, it is written back to the original AMT area 18a.

Next, an operation of writing data to the partition of the disk 180 using the RAID speed-up driver 100 will be described with reference to FIG. 4. In the following description, the write target data stripe is the "stripe 34".

Figure 4:
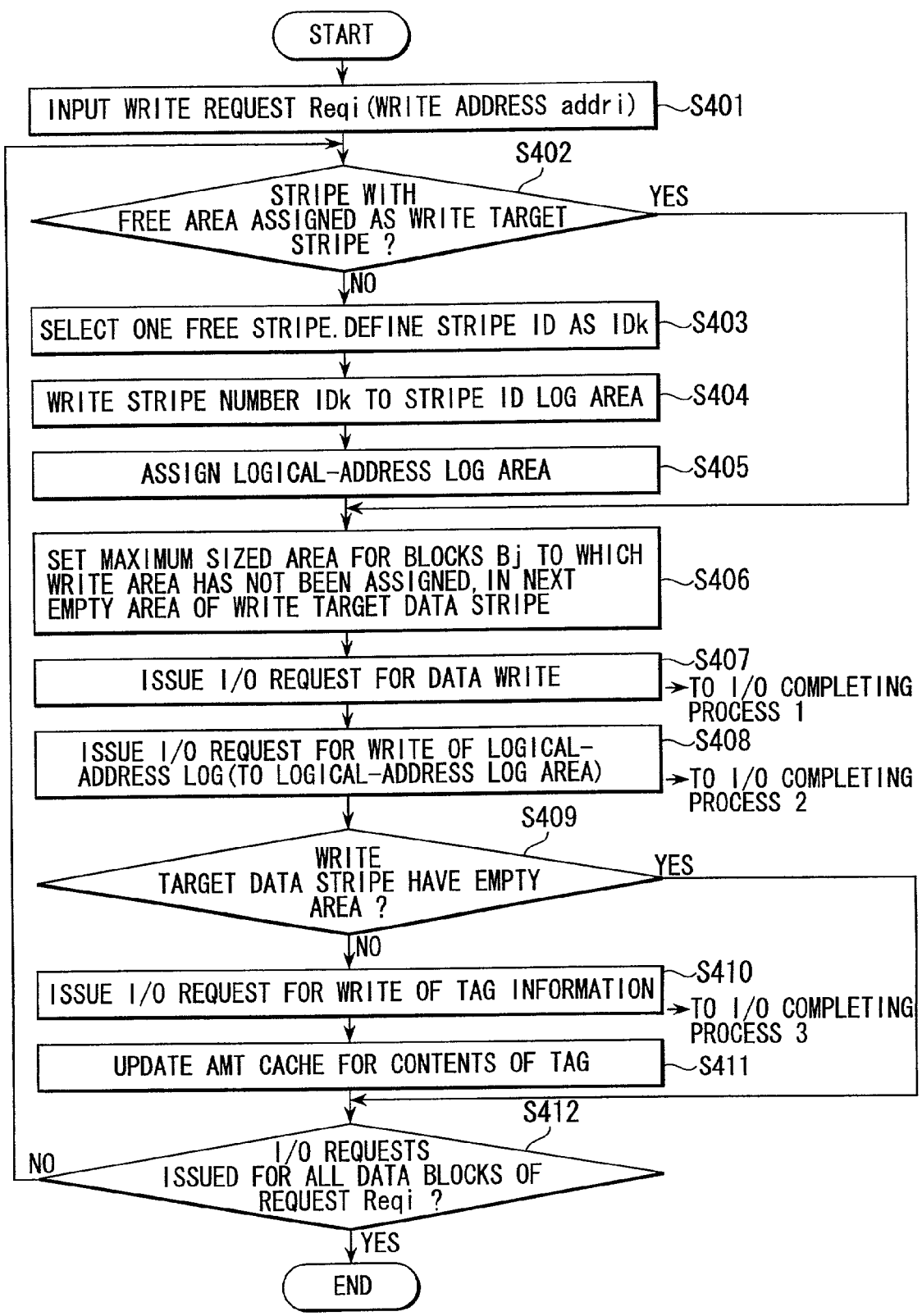
FIG. 4 is a flow chart showing a main routine for a write process according to the first embodiment of the present invention.

FIG. 4 shows a process with a main routine for the write process. The OS file system 50 inputs a write request Reqi (i=1, 2, 3, 4, . . . ) composed of write block data B0 to Bn starting with a logical address addri and each consisting of 2 KB (step S401).

The write request Reqi is checked to see whether or not the assigned write target stripe has an empty area (step S402). If it has no empty area, one of the free stripes on the disk is selected (step S403). Then, the ID of this stripe (in this example, the stripe 34) is defined as IDk, which is then written to the stripe ID log area 18b1 of the data managing area 18b as the next entry (step S404). The stripe ID log area 18b1 has the IDs of stripes recorded therein in a time series manner, the stripes having been selected as the write target.

Then, the RAID speed-up driver 100 assigns the logical-address log area 18b2 of the managing data area 18b (step S405). The logical-address log area 18b2 is used to memorize the data logical addresses of the data of the write request Reqi when the data are written to the data stripe 34. The logical-address log area 18b2 has the ID of the write target data stripe recorded in its head, and subsequently stores data indicating which data, corresponding to a logical address, is retained by each of the physical blocks constituting the stripe. If the write target data stripe 34 has already been assigned at step S402, steps S403, S404, and S405 are omitted and the process proceeds to step S406.

Then, the RAID speed-up driver 100 assigns the write request Reqi to the empty area of the write target data stripe 34 by dividing the request into 2-KB blocks. This operation continues until all the empty areas of the data stripe 34 has been used up or all the blocks of the write request Reqi have been assigned (step S406).

Then, the RAID speed-up driver 100 issues an I/O request for a data write to the data stripe 34 (step S407). At this time, the data that can be written to the data stripe are grouped into one on the write buffer 171, before the I/O request is issued. For example, the write request Req1 in FIG. 3 requires two 2-KB block data to be written to the data stripe, but the I/O request is issued by considering these data as one write request. This enables efficient writes based on the characteristics of the disk. Furthermore, an I/O request is issued which requires information on the logical addresses of the write data to be written to the logical-address log area 18b2 assigned at step S405. In this example, the stripe ID=34 is written to the head of the logical-address log area 18b2. As the logical addresses V of subsequently written data, V=100 and 101 is written for a write of the two-block data of the write request Reqi, and similarly V=76, 77, and 78 is written for the three-block data of the request Req2, V=60 is written for the one-block data of the request Req3, and V=79, 80, 81, and 82 is written for the four-block data of the request Req4 (step S408). The I/O requests issued at steps S407 and 408, described above, are processed asynchronously.

Then, it is checked whether or not the write target data stripe 34 contains any empty area (step S409). If it is determined to contain no empty area, that is, write data amounting to the total capacity of the write target data stripe 34 have been provided, an I/O request for a write of TAG information (a table for the logical block numbers of the blocks written to the target data stripe 34) is issued (step S410). The TAG information may in principle be arranged anywhere on the disk 180, but in this variation of the embodiment, is present as one block of the data stripe 34. The process of writing the TAG information at step S410 is executed asynchronously. Then, TAG information on the data blocks written to the write target data stripe 34 is registered in the AMT cache 172, which is then updated (step S411). This process is also executed asynchronously because the operation of the AMT cache 172 may require an I/O request. On the other hand, if the write target data stripe 34 is determined to contain any empty area at step S409, steps S410 and S411, described above, are omitted, and the process proceeds to step S412.

Finally, the RAID speed-up driver 100 determines whether or not write I/O requests have been issued for all the data blocks in the request Reqi (step S412). If there still remain any data to write, the process returns to step S402 to assign a new stripe and make write requests as described above.

If write I/O requests have been issued for all the data blocks of the write request Reqi at step S412, described above, the disk write process is completed.

Figure 5:
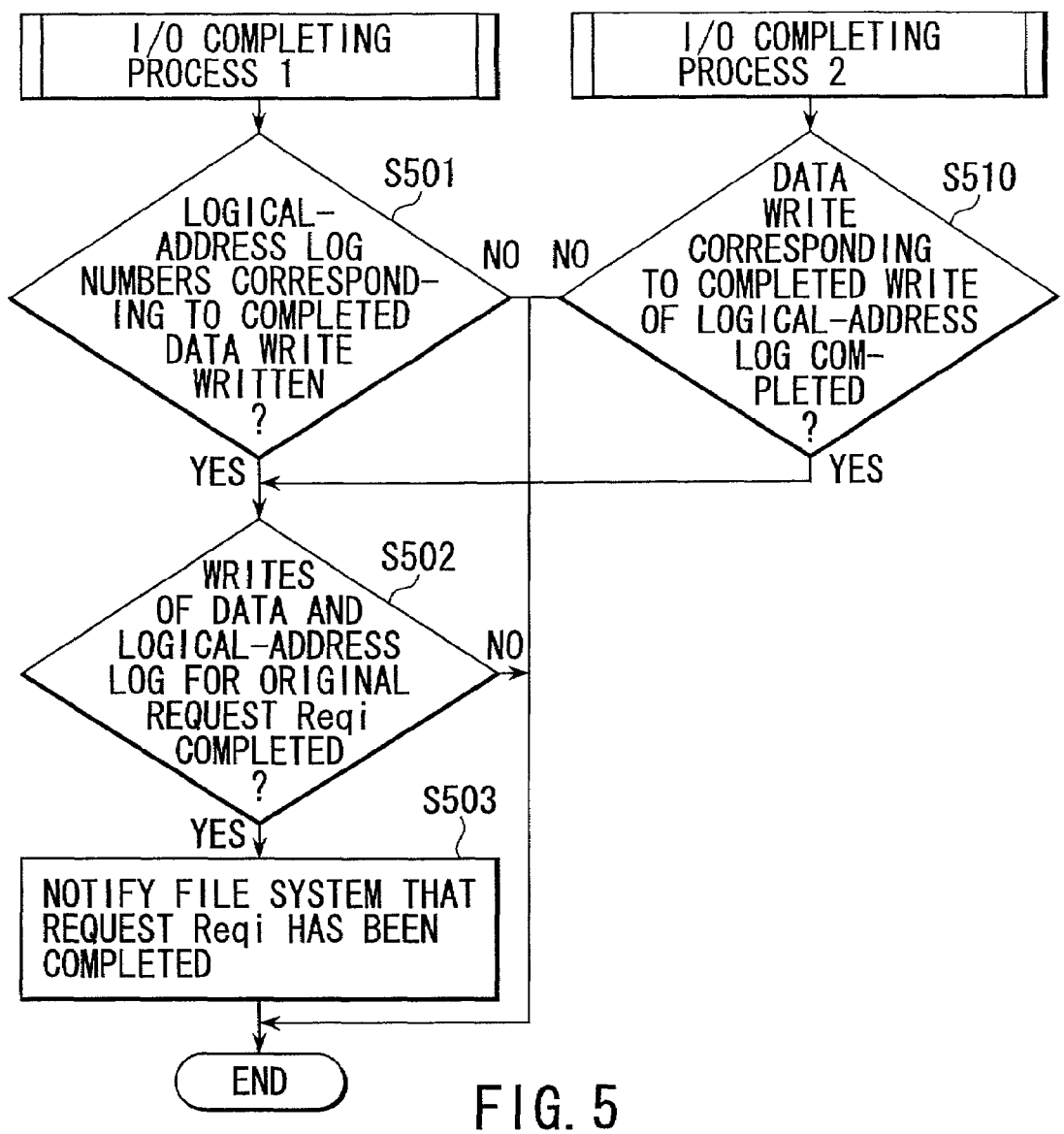
FIG. 5 is a flow chart showing the procedure of I/O completing processes 1 and 2 according to the first embodiment of the present invention.

FIG. 5 is a flow chart showing the operation of a process of completing the I/O requests issued at steps S407 and S408, described above (this is normally a completion interrupting process). An I/O completing process 1 corresponds to step S407, whereas an I/O completing process 2 corresponds to step S408.

Once the data has been written (I/O completing process 1), the RAID speed-up driver 100 checks whether or not logical address log numbers corresponding to the completed data write have been written (step S501). On the other hand, once all of the logical address log has been written (I/O completing process 2), a data write process corresponding to the completed write of the logical address log has been completed (step S510). If these writes have been completed, it is checked whether or not the writes of all the data and logical address log relating to the original write request Reqi have been completed (step S502). If these writes have been completed, the RAID speed-up driver 100 notifies the OS file system 50 that all the writes to the disk for the write request Reqi have been executed (step S503). That is, once all the write blocks have been written to the data stripe 34 and the logical-address information for these blocks have been written to the logical-address log area 18b2, the RAID speed-up driver 100 notifies the OS file system 50, having issued the write request Reqi, that the request has been completely completed.

Figure 6:
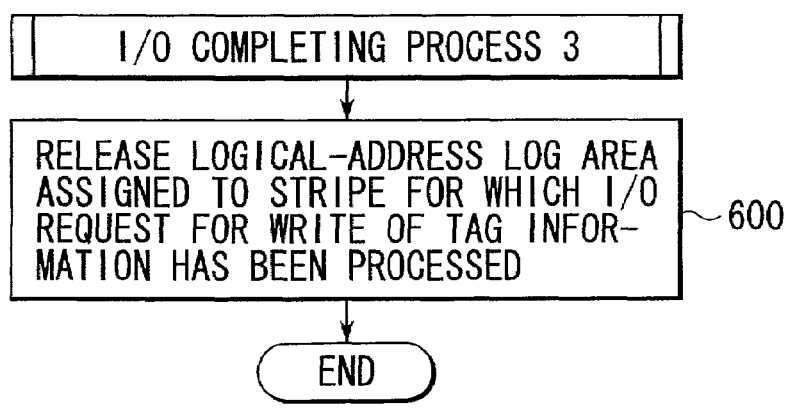
FIG. 6 is a flow chart showing the procedure of an I/O completing process 3 according to the first embodiment of the present invention.

FIG. 6 is a flow chart showing the operation of a process of completing a TAG write I/O request described in step S410 in FIG. 4. In the process of completing a TAG write I/O request (I/O completing process 3), the logical-address log area assigned to the stripe 34, for which the TAG write I/O request has been completed, is released (step S600) to complete the write of the TAG information.

The first variation of the embodiment has been described. Data are conventionally written to physically separate areas on the disk in response to a random write request, so that the performance decreases due to disk seeking and rotation waiting operations. According to the present invention, instead of the non-volatile memory, the AMT area 18a (including the AMT cache 172 on the main memory), managing data area 18b, and data area 18c, provided on the disk, can be used to execute the write as one to an area in which random writes are physically contiguous to one another. Consequently, the adverse effects of seeking and rotation waiting operations are reduced, thereby achieving a fast write process. For disks of the RAID5 configuration, if stripe boundaries and sizes are adjusted so as to execute writes for respective parity groups, once all the writes to the stripe have been executed, the parity group is provided on the cache memory of the RAID controller. Consequently, no discrete process is required for calculating the parity, thus making it possible to eliminate what is called the "RAID5 write penalty" to thereby achieve a fast write process.

Further, if an unexpected system down aborts the process to before the series of data writes are completed, the logical-address log information recorded in the logical-address log area 18b2 can be used to execute a data recovery process after system reboot. The logical-address log information becomes unnecessary when the relationship between the logical and physical addresses of all the write data blocks written to the write target data stripe 34 is registered as the TAG information.

(Second Variation of the Embodiment)

A second variation of the embodiment of the present invention will be described.

In the first variation of the embodiment shown in FIG. 4, the assignments for the logical-address log area 18b2 have been executed when assigning the empty area of the stripe at steps S403 to S405. Fixed one logical-address area 18b2 may be provided as shown in FIG. 3 or a plurality of logical-address log areas 18b2 may be provided. In the second variation of the embodiment, the write process is executed using a plurality of logical-address log areas 18b3.

First, according to this variation of the embodiment, when a new logical-address log area is assigned at step S405 in FIG. 4, one of a plurality of logical-address log areas (18b2-1 to 18b2-m) is selected which has been most recently used and released.

To achieve this, an arrangement is provided for managing the logical-address log area 18b2 used based on the LRU method. Stack-like free-source managing means (not shown) is also provided which relates to ID numbers indicative of the logical-address log areas (18b2-1 to 18b2-m). During system initialization, the IDs of all the logical-address log areas are registered in the free-resource managing means.

Once the TAG write has been completed at step S410 in FIG. 4, the RAID speed-up driver 100 releases the logical-address log area assigned to that stripe (step S600 in FIG. 6). In this case, the ID number (assumed to be 18b2-1) indicative of the released logical-address log area is placed at the top of a stack of the free source managing means. At step S405 in FIG. 4, if a new logical-address log area is required, the ID number accumulated at the top of the stack is read, and the logical address log area 18b2-1 corresponding to that address is obtained. That is, the most recently released logical-address log area 18b2-1 is obtained. This management enables the constant use of the "logical-address log area that has been most recently subjected to a write process and then released".

In general, with a RAID controller having a cache mounted therein and backed up by batteries, when the same areas undergo repeated writes, the cache retains the data for a long time. Accordingly, subsequent write processes with respect to these areas become faster. In the second variation of the embodiment, this characteristic is used to manage the logical-address log area 18b-2 so as to use the same logical address log area 18b2-1 as often as possible, thus reducing write overheads.

The effects of the second variation of the embodiment will be described in further detail.

Data writes are efficient because the data are written to a continuous area corresponding to a stripe as a parity group. Writes of logical-address log information, however, are not always executed on the basis of the parity group and are thus inefficient. The completion notification is issued in response to the write request after both the "write of data" and the "write of logical-address log information" have been completed. Thus, if the write of logical-address log information is delayed, the "entire write process" is delayed.

On the other hand, with a RAID controller having a cache memory for managing the addresses of read and write data in the disk and having a write back cache function, if a write request for the same address is repeated, the second and subsequent writes are often completed in a short time. This is because the last data written to the write back cache has been stored and because if data is written to the same address, the data on the cache has only to be changed. Thus, no actual write to the disk is executed. According to the policy of the RAID controller toward cache control, that cache areas is later written to the disk and then released. If, however, a write to the same address is periodically repeated at short intervals, that cache area is constantly obtained to enable relatively fast accesses.

In a second variation of the embodiment, this characteristic is used to increase the speed of the write process for a logical address log. For example, (1) a plurality of areas (logical-address log areas) are provided to which log information on the logical addresses of data corresponding to data writes to one stripe is saved. (2) If a new write target data stripe is to be assigned, one of the currently out-of-use "logical-address log areas" which was most recently used is selected and used as an area to which logical-address log information is written when data are written to the stripe. (3) After all the data have been written to the target data stripe, the blocks to which the data have been written are registered with the TAG information of the target data stripe. Once all the blocks have been registered, the "logical-address log area" having been used is released.

By managing the "logical-address log area" on the basis of the LRU method as described above, the logical-address log information is written to a limited fixed area (or a plurality of such areas) on the disk. Consequently, writes to the logical-address area become faster and are thus completed earlier.

(Third Variation of the Embodiment)

Now, a third variation of the embodiment will be described.

Figure 7:
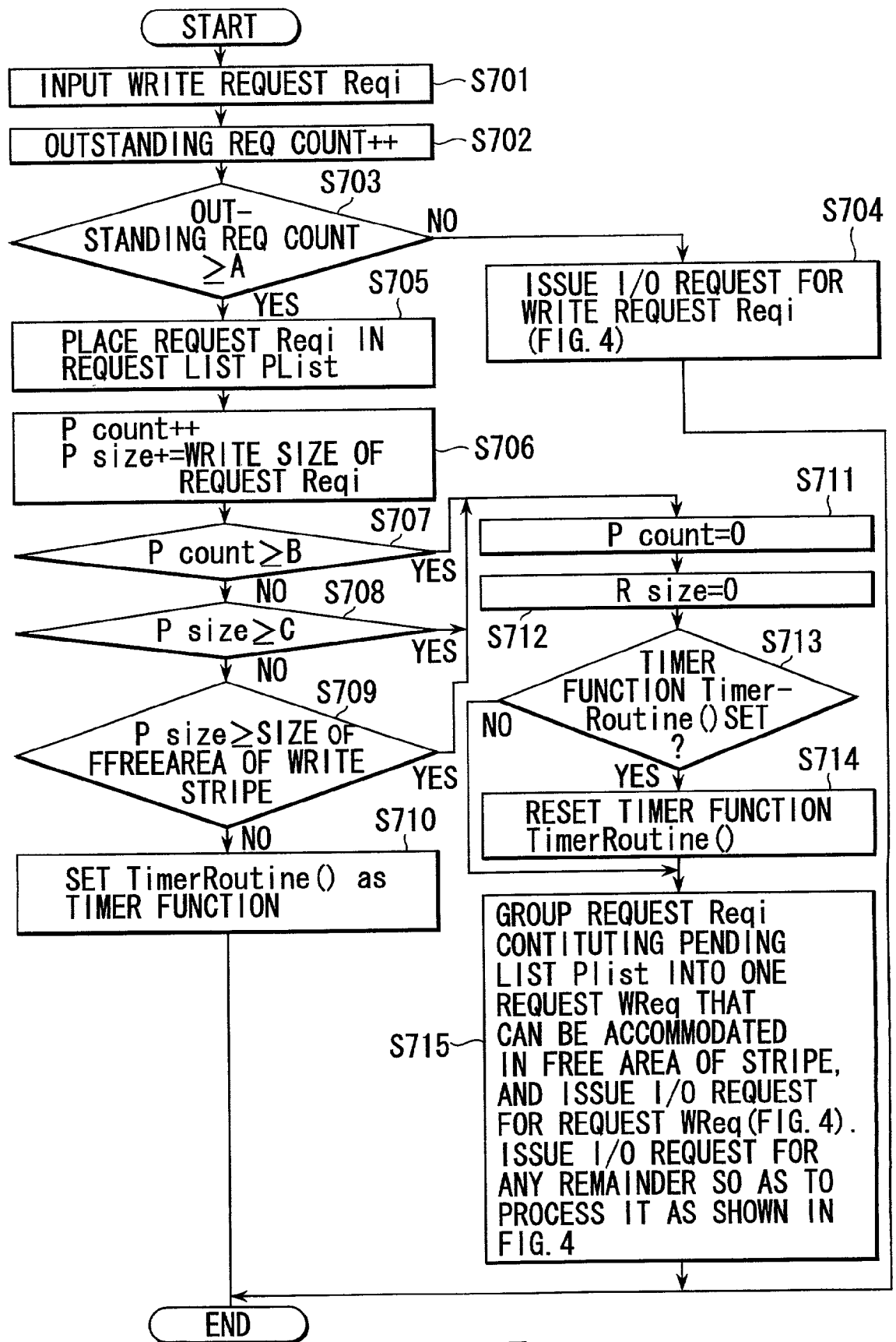
FIG. 7 is a flow chart showing a main routine for a write process according to a third embodiment of the present invention.

FIG. 7 is a flow chart showing an operation of the third variation of the embodiment.

In the third variation of the embodiment, a plurality of write requests are written at a time. This is achieved by using a variable (Outstanding Req Count) managing the number of outstanding write requests being processed by the RAID speed-up driver 100. The variable Outstanding Req Count is assumed to be initialized to "0".

In FIG. 7, upon receiving the write request Reqi from the OS file system 50 (step S701), the RAID speedup driver 100 registers the write request Reqi to the variable Outstanding Req Count (step S702). That is, the content of the variable Outstanding Req Count (counter value) is incremented by one. Then, it is checked whether or not the variable Outstanding Reqi Count is larger than a certain constant "A" (step S703). If the variable is smaller than the constant "A", the process proceeds to step S704, where an I/O request for the write request Reqi is issued as shown in FIG. 4 (step S407 in FIG. 4).

On the other hand, if the variable Outstanding Req Count is equal to or larger than the constant "A", the write request Reqi is kept pending. The write request Reqi (a plurality of write requests can be registered) is placed in a pending request queue Plist, and when the following conditions are met, all the write requests are written at a time:

(Conditions for the Issuance of an I/O Requests for Pending Write Requests)

a) The number Pcount of pending requests Reqi is equal to or larger than a constant "B" (check at step S707).

b) The total of the data sizes Psize of the pending requests Reqi is equal to or larger than a constant "C" (check at step S708).

c) The total of the data sizes Psize of the pending requests Reqi equals or exceeds the size of the remaining empty area of the current write target data stripe (check at step S709).

Figure 8:
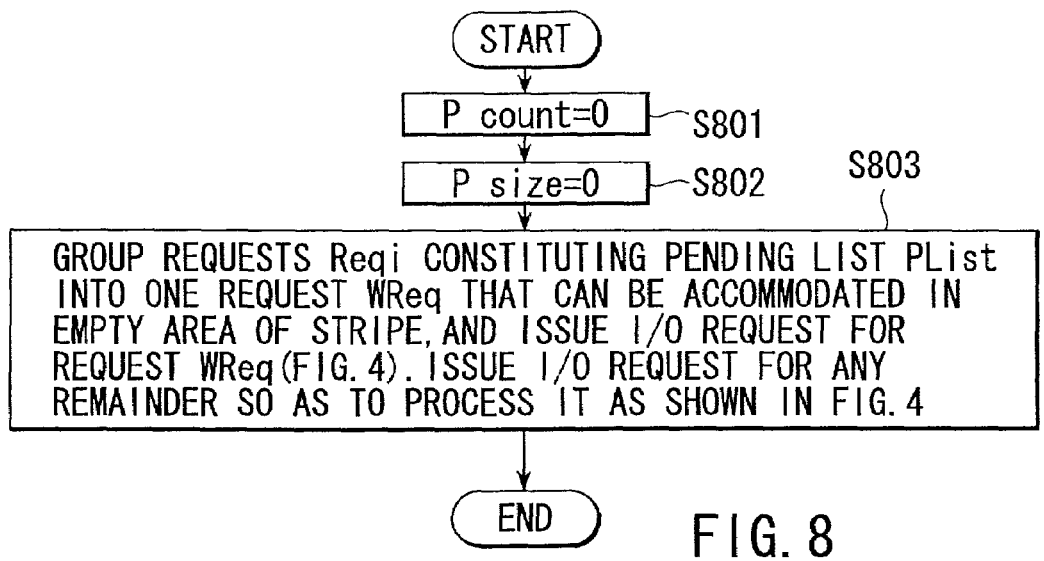
FIG. 8 is a flow chart showing the procedure of a timer function according to the third embodiment of the present invention.

A timer function TimerRoutine ( ) is registered for a service of the OS (Operating System), and executes, when a time and a function are designated, the designated function after the designated time has passed. In this case, for example, the command "execute the designated function TimeRoutine ( ) 30 ms later" is registered in the OS. A process executed by the timer function TimerRoutine ( ) and set at step S710 is shown in FIG. 8.

In FIG. 7, the following variables are used for management in order to determine the above described conditions a) to c).

Number of pending requests . . . Pcount

Total of the data sizes of pending requests . . . Psize

If any of the above described conditions a) to d) is met (Yes at step S707, Yes at step S708, Yes at step S709, or step S710), the variables Pcount and Psize are cleared to zero (steps S711 and S712 and steps S801 and S802 in FIG. 8). It is further checked whether or not the timer function Timer Routine ( ) has been set (step S713). If this function Timer Routine ( ) has been set, it is reset (step S714). Then, the write requests in the pending list PList are set as one write request WReq to execute a write process according to the procedure at step S407 in FIG. 4 (step S715 and step S803 in FIG. 8).

In this case, if data are written to the write target data stripe (for example, the stripe 34) in response to the write request WReq, into which the requests connected to the pending list PList are grouped, then instead of individually writing the data of the plurality of write requests constituting the write request WReq, the data of the one write request WReq are written at a time. Further, for writes to the logical-address log area 18b2, the data of the entire write request WReq are written at a time. A process of completing these writes is shown in FIG. 9.

Figure 9:
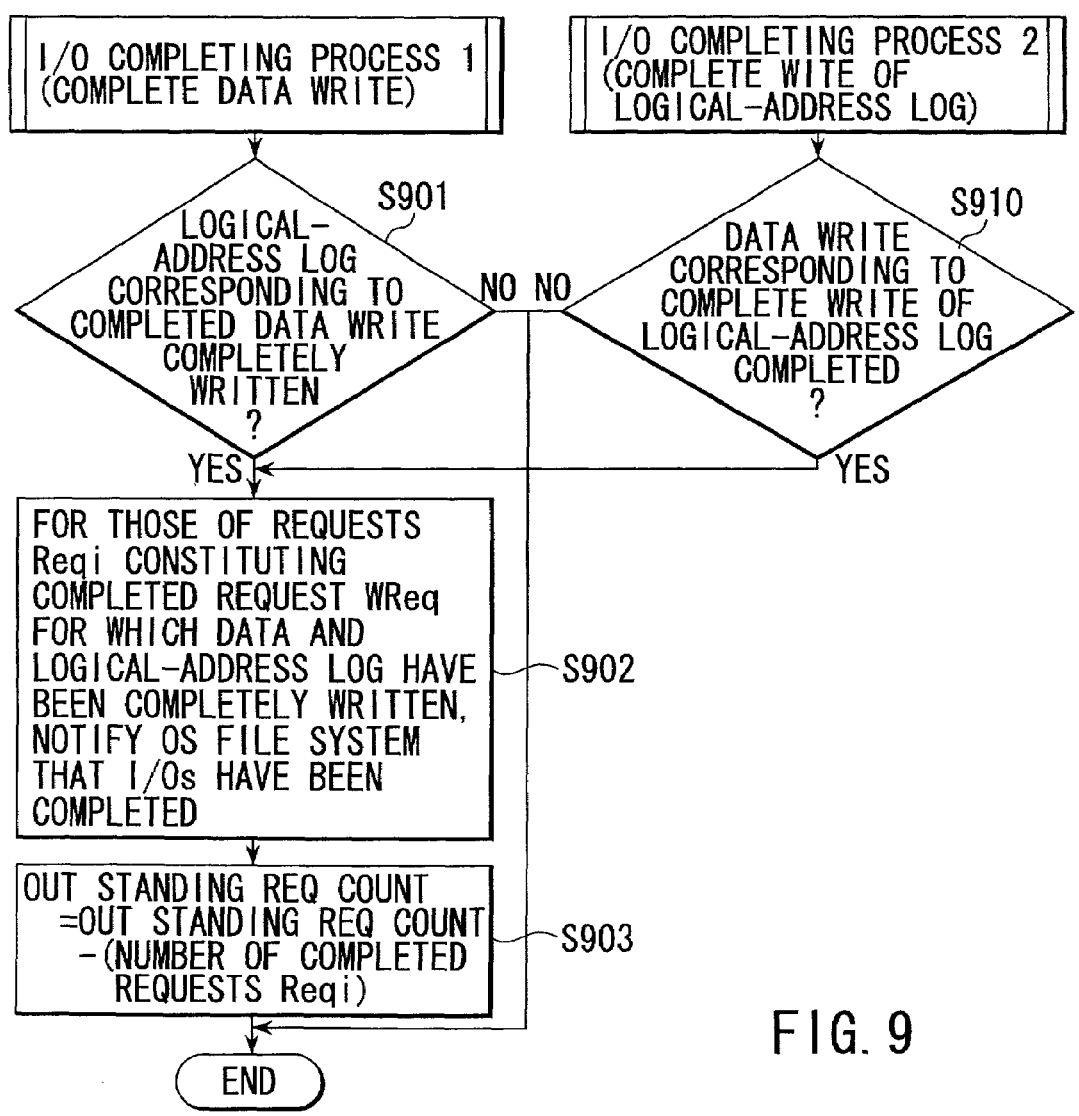
FIG. 9 is a flow chart showing the procedure of I/O completing processes 1 and 2 according to the third embodiment of the present invention.

In FIG. 9, for the write request Reqi, the RAID speed-up driver 100 checks whether or not all the logical-address log numbers have been written once the data write has been completed (I/O completing process 1) (step S901), and checks whether or not the data has been written once the logical-address log has been completely written (I/O completing process 2) (step S910). If these writes have been completed, the RAID speed-up driver 100 determines that the data and logical-address log for the original write request Reqi have been completely written, and notifies the OS file system 50 of the I/O completion (step S902). The RAID speed-up driver 100 subtracts the value for the completed write request Reqi from the value of the variable Outstanding Req Count and records the result of the subtraction as a new value of the variable Outstanding Req Count, thus completing the process (step S903).

An example of a specific operation of the third variation of the embodiment will be described with reference to FIGS. 10A, 10B and 11. In the example of operation described below, a large number of write requests Reqi from the OS file system 50 concurrently arrive at the RAID speed-up driver 100. FIG. 10A shows that four Req1 to Req4 of these write requests arrive at the RAID speed-up driver 100. At this time, the RAID speed-up driver 100 has already been processing a plurality of write requests. When these request arrive, the condition Outstanding Req Count≧A has been met. That is, the result of the determination at step S703 in FIG. 7 is affirmative.

FIG. 10A shows a write size and a logical block number for each of the write requests Req1 to Req4. In this case, the RAID speed-up driver 100 manages each 2 KB of data, and the write addresses from the OS file system 50 are shown as the logical block numbers of the write targets. For example, a logical block number 100 means that this is a write target address designated by the OS file system and the address (=the offset on the disk) is 100×2 KB=200 KB. Further, the write request Req1 requires 4 KB data to be written to the logical address number 100 of the write target, but since the RAID speed-up driver 100 manages each 2 KB of data, it is understood that the request Req1 requires the logical address numbers V=100 and 101 to be assigned. Likewise, since the request Req2 designates 6 KB, it requires the logical address numbers V=76, 77, and 78 to be assigned. Since the request Req3 designates 2 KB, it requires the logical address number V=60 to be assigned. Since the request Req4 designates 8 KB, it requires the logical address numbers V=79, 80, 81, and 82 to be assigned. Then, it is assumed that the constant B is four and that the condition Pcount≧B at step S707 has been established.

It is assumed that the pending request list PList initially contains no write request and that the write requests Req1 to Req4 arrive in this order. These requests are sequentially stored in the pending request list PList, and are arranged as shown in FIG. 10B when the write request Req4 arrives.

At this time, the condition at step S707 in FIG. 7 is established, and the control shifts to step S711. At step S715, the four write requests Req1 to Req4 (20 KB in total) in the pending request list PList are written to the disk 180 as the one write request WReq according to the procedure shown in FIG. 4. At this time, if the 20-KB data from the write request WReq do not fit in the remaining empty area of the write target data stripe (for example, the target 34), that size of data (for example, 10 KB) which fits in the empty area is separated and processed. The remaining 10-KB data are grouped into another write request Wreq, for which an I/O request is then issued with respect to another stripe with an empty area.

FIG. 11 shows the corresponding write to the disk 180. The write requests Req1 to Req4 from the file system are originally four separate requests, but since the write target addresses constitute the one continuous data stripe 34, these requests are grouped into the one write request WReq for the write process. Similarly, the logical address information V=100, 101, 76, 77, . . . 82 is written, via one write I/O request, the logical-address log area 18b2, corresponding to the data for which the batch write has been issued.

As a result, although, in the prior art, four I/O requests are required for each of the data write to the write target data stripe 34 and the write of logical-address log information to the logical-address log area 18b2, all these writes can be executed with only two write I/O requests by storing the data and logical-address log information in the pending request list PList before the write process. Consequently, the number of I/O requests issued can be reduced to increase the write speed on the basis of the collective write. In the above described example, it is assumed that the constant B is four and that the condition Pcount≧B has been established. The above description, however, also applies to the case where any of the above described other conditions b), c), and d) has been established (step S708, S709, or S710).

According to the third variation of the embodiment, by using a counter to manage the number of requests transmitted by the upper file system and which are being processed by the RAID speed-up driver at a certain time and for which the completion notification has not been issued yet (specifically, requests that have entered a disk control system driver and for which the completion notification has not been issued yet), the "number of write I/O requests simultaneously issued" at an arbitrary time can be obtained. If the "number of write I/O requests simultaneously issued" is equal to or larger than a predetermined value A, then for subsequent write requests, writes of corresponding data and logical-address log information are started after a fixed time has passed. Then, if (1) a fixed number of write requests or more newly arrive, (2) the total of the write sizes of write requests that have arrived exceeds a fixed size, (3) the total of the write sizes of write requests that have arrived exceeds the size of the remaining empty area of the current write target stripe, or (4) a fixed time has passed, all the data of the pending write requests are written to the target stripe at a time. All of the logical-address log information for the simultaneously written data blocks (plural) is written to the logical-address log area at a time.

As a result, the plurality of write requests are converted into the one data write process and the one write process for the logical-address log information. The start of each data request is delayed, but the number of write processes decreases, while the write size increases. Consequently, the total overhead of writes to the disk decreases to thereby improve the throughput of the write process.

(Fourth Variation of the Embodiment)

Next, a fourth variation of the embodiment of the present invention will be described.

In the fourth variation of the embodiment, not only the logical-address log information but also the write data size and a checksum are recorded in the logical-address log area 18b2.

Figure 12:
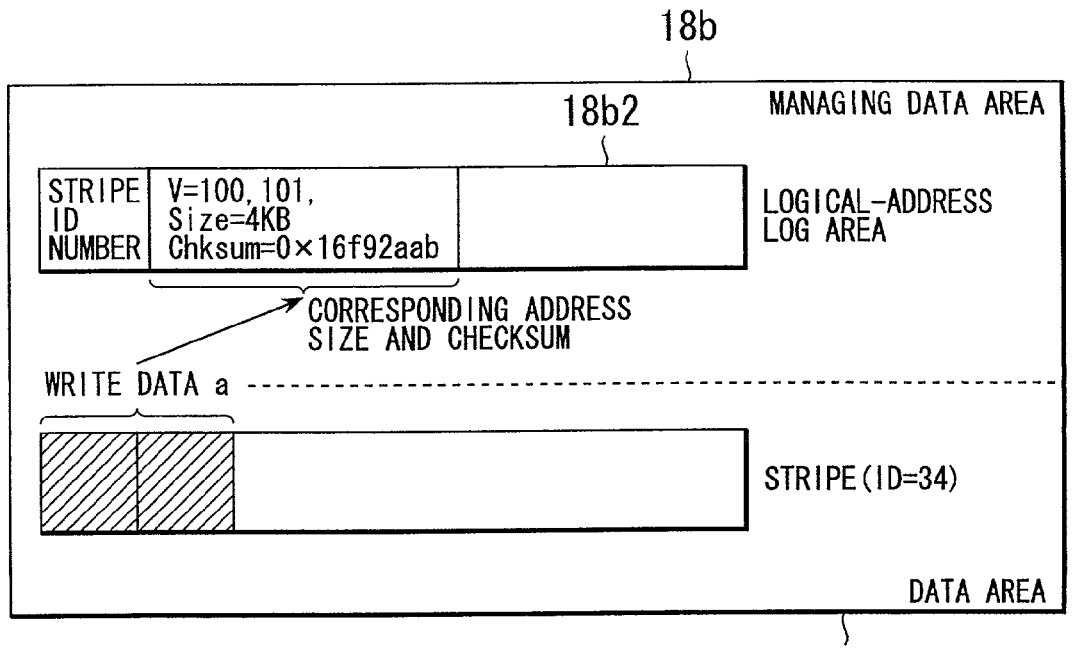
FIG. 12 is a diagram showing the data stripe and a write to the logical-address log area according to a fourth embodiment of the present invention.

FIG. 12 shows how, for write data a of the write request Req1, the (1) logical addresses V=100 and 101, a (2) write size Size=4 KB, and a (3) checksum ChkSum=0x16f92aab are written to the logical-address log area 18b2, corresponding to the write target data stripe 34. The checksum ChkSum is the value of the result of the summation of every 4 bytes of the write data a. When the write data size and the checksum are thus recorded in the logical-address log area, the system can recover from failures more easily.

That is, if the system fails while data are being written to the data area 18c of the disk 180, it is checked whether or not the checksum value being written to the logical-address log area 18b2 of the stripe undergoing the write process equals the checksum value determined from the data of the data area 18c. If these checksum values are equal, then it is determined that the data write has been completed, and the data are treated as valid. Then, the remaining part of the process (registration in the address mapping table or the like) is executed to complete the write process. If the checksum values are not equal, it is determined that the write has not been completed, and the data are discarded.

(Fifth Variation of the Embodiment)

Now, a fifth variation of the embodiment will be described.

In the fifth variation of the embodiment, the write data a are written not only to the write target data stripe 34 but also to the logical-address log area 18b2 together with the logical-address log information.

Figure 13:
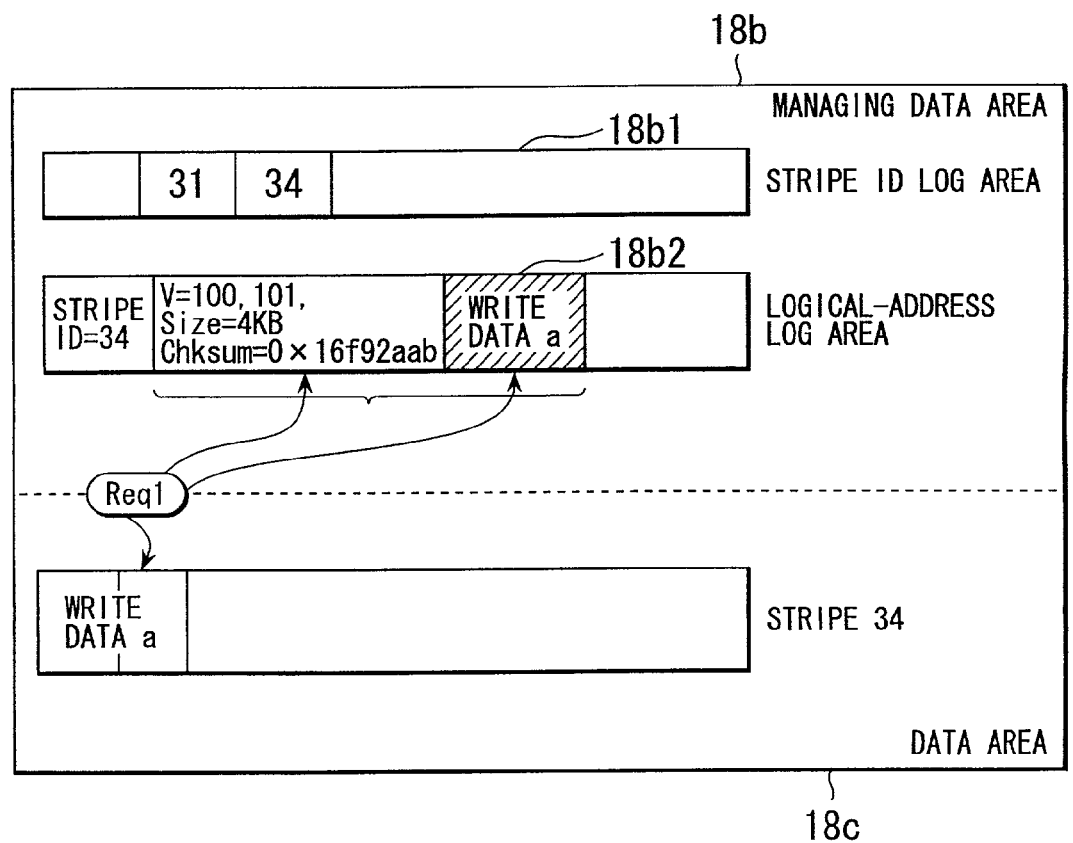
FIG. 13 is a diagram showing the data stripe and a write to the logical-address log area according to a fifth embodiment of the present invention.

FIG. 13 shows the organization of data written the logical-address log area 18b2 according to the fifth variation of the embodiment. That is, the (1) logical addresses V=100 and 101, the (2) write size Size=4 KB, the (3) checksum ChkSum=0x16f92aab, and the (4) write data a (4 KB) are written to the logical-address log area 18b2. The items (1) to (4) are actually processed through one I/O request, so that the overhead can be reduced.

Figure 14:
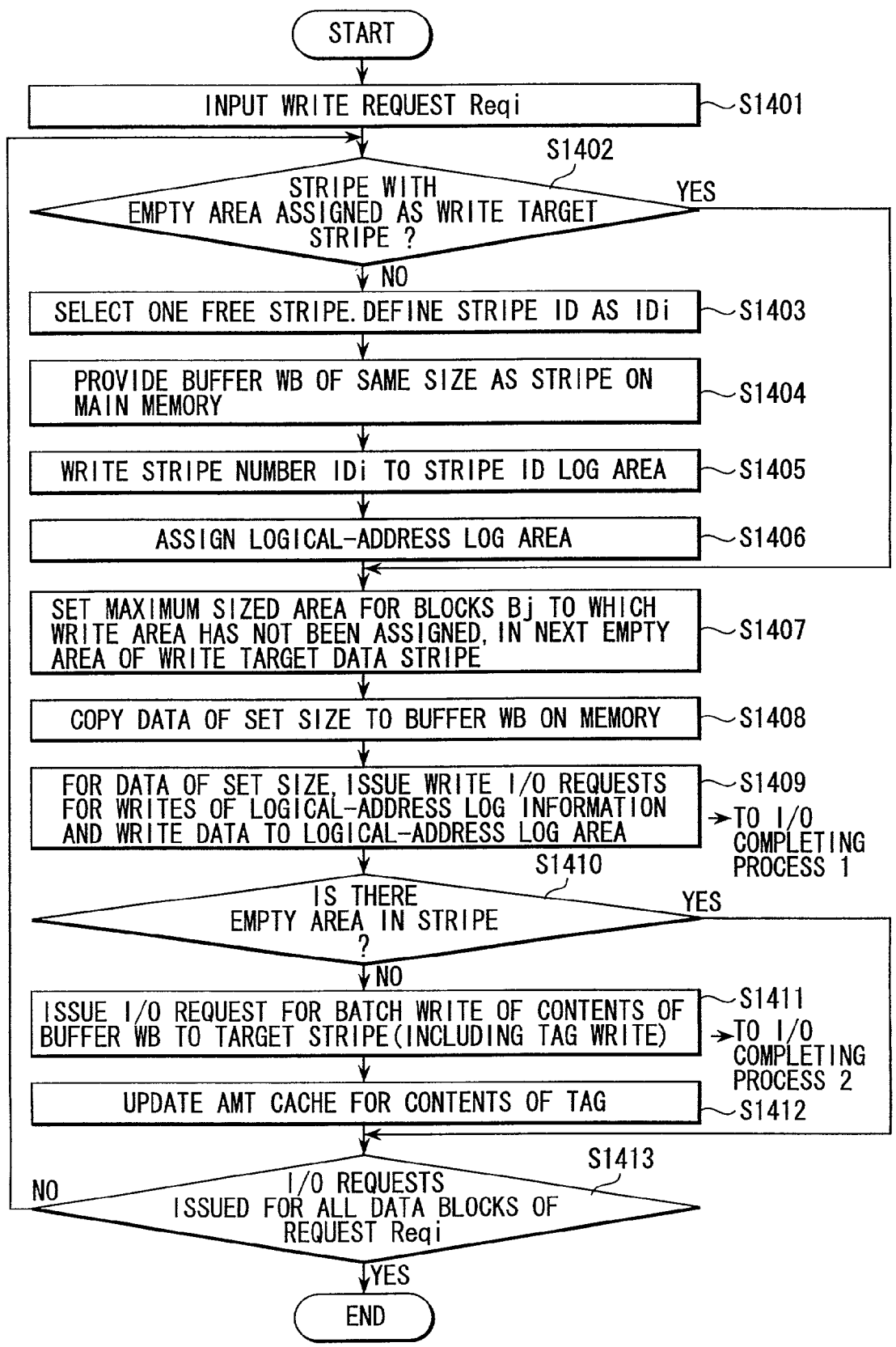
FIG. 14 is a flow chart showing a main routine for a write process according to the fifth embodiment of the present invention.

FIG. 14 is a flow chart showing the procedure of an operation performed by the RAID speed-up driver 100 according to the fifth variation of the embodiment. The OS file system 50 inputs the request Reqi (i=1, 2, 3, 4, . . . ), which is composed of write block data B0 to Bn starting with the logical address addri and each consisting of 2 KB (step S1401).

It is checked whether or not any data stripe with an empty area has been assigned to the write request Reqi as the write target stripe (step S1402). If no such a data stripe has been assigned, one of the free stripes on the disk is selected (step S1403). Then, a buffer WB of the same size as this data stripe is provided on the main memory 13 (step S1404). The buffer WB is provided on the write buffer 171. The ID of the assigned stripe is defined as IDk and is written to the stripe ID log area 18b1 of the data managing area 18b as the next entry (step S1405). The IDs of stripes selected as the write target are recorded in the stripe ID log area 18b1 in a time series manner (31, 34, . . . ).

Then, the logical-address log area 18b2 of the managing data area 18b is assigned (step S1406). Data blocks Bj to which no write area has been assigned are provided with as large part of the next empty area of the write target data stripe (for example, the stripe 34) as possible (step S1407).

The RAID speed-up driver 100 copies the data of the size ensured at step S1407, to the buffer WB (step S1408). The buffer WB is a write buffer provided on the main memory 13 and having a size equal to the stripe area.

Then, at step S1409, (1) logical-address information and (2) write data are written to the logical-address log area 18b2 via one write I/O request, as shown in FIG. 13. If the data stripe has no empty area and all the data written to the stripe fit in the buffer WB (step S1410), an I/O request is issued for a batch write of the contents of the buffer WB to the write target data stripe 34, and TAG information is written to the write target data stripe 34 of the disk 180. Then, the TAG information is registered in the AMT cache 172, which is then updated (step S1412). On the other hand, at step S1410, if the write target data stripe has some empty area, the processing at steps S1411 and S1412 is omitted, and the process proceeds to step S1413. At step S1413, it is determined whether or not all the I/O requests for the data blocks of the write request Reqi have been issued. If there still remain data to write, the process returns to step S1402 to assign a new stripe and make write requests as described above.

In this variation of the embodiment, one data block of the write target data stripe 34 is set as the TAG area. Accordingly, at step S1411, if the write to the buffer WB has been completed with the TAG data previously set on the buffer WB, the write of the TAG data is simultaneously completed.

Figure 15A:
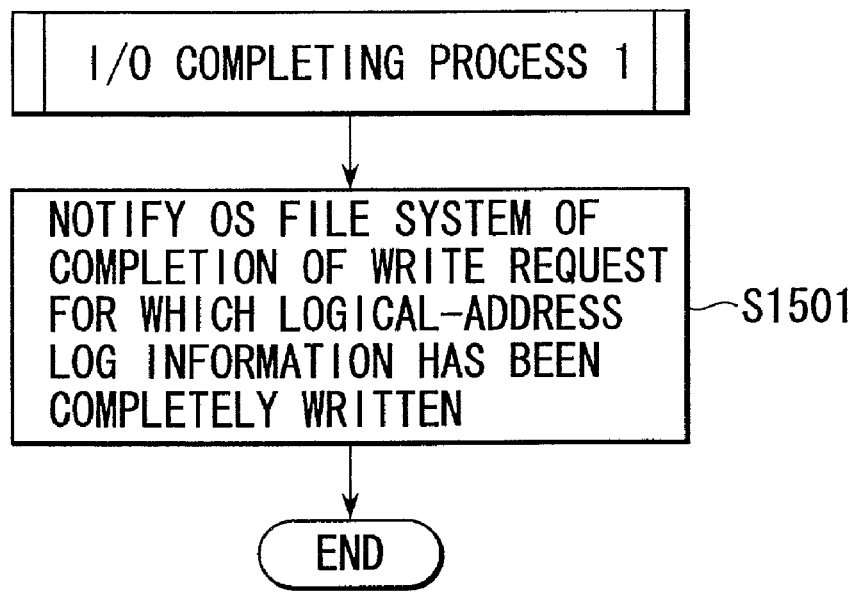
FIGS. 15A and 15B illustrate a flow chart showing the procedure of an I/O completing processes 1 and 2 according to the fifth embodiment of the present invention.
Figure 15B:
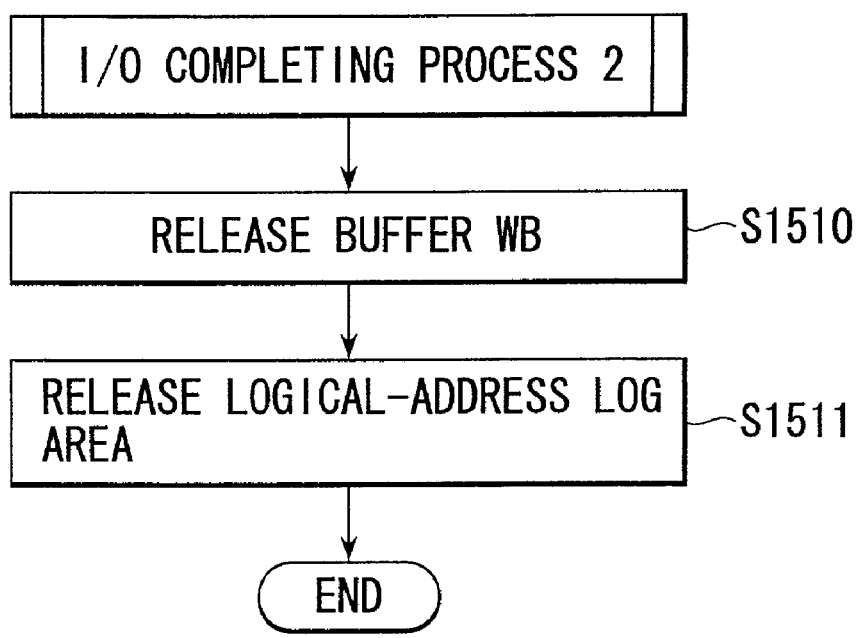

FIGS. 15A and 15B illustrate a flow chart showing the operations of the I/O completing processes at steps S1409 and S1411 in FIG. 14. FIG. 15A shows the completing process (I/O completing process 1) executed on the logical address log area 18b2 at step S1409. In this case, once the write for the write request Reqi have been completed, the OS file system 50 is notified of the "completion" (step S1501). On the other hand, FIG. 15B shows the write completing process (I/O completing process 2) executed on the write data target data stripe at step S1411. In this case, once the write to the target data stripe has been completed, the buffer WB is released (step S1510), and the logical-address log area 18b2 is further released to complete the process (step S1511).

The fifth variation of the embodiment is compared with the above described first variation of the embodiment. In the fifth variation of the embodiment, once the logical address log information and the write data a have been completely written to the logical-address log area 18b2, the OS file system 50 can be notified of the completion. That is, a quicker response is provided to the OS file system. On the other hand, in the first variation of the embodiment, the completion notification is not executed before the two write I/O requests have been completed, that is, the writes to the logical-address log area 18b2 and the write target data stripe 34 have been completed.

On the other hand, if each write data is considered, then in the fifth variation of the embodiment, the two writes are executed, including the one to the logical-address log area 18b2 and the one to the data stripe 34. The duplicate write of the write data a to the logical-address log area 18b2 may impose heavy burdens depending on the characteristics of the RAID controller 16 even if Variation 2 of the embodiment is used to effectively utilize the cache so that the data is written to the same area. Thus, the selection of either the first or fifth variation of the embodiment depends on the characteristics of the RAID controller 16 used; one of the variations which consequently exhibits better performance is selected.

(Sixth Variation of the Embodiment)

If the system fails while the RAID speed-up driver 100 is executing a write process, the system may be started up before the data, logical address log information, or the like is not all written. In such a case, blocks that have been completely written can be registered back in the TAG area corresponding to the write target data stripe and to the AMT cache 172 to enable the registered data to be subsequently accessed. In this case, it is determined that the data written to the disk 18 are correct if equality is detected between the checksum information for the data saved as the logical-address log information and the checksum recalculated from the target data area. In this case, it must be ensured that the value saved to the logical-address log area 18b2 (and including the data checksum value) is "really correct". Thus, for example, for each entry of the logical-address log area 18b2, (x) when the entry is written, a particular string (signature) is placed at the beginning and end of the area of the entry so as to be checked upon a read, (y) the checksum of the entire entry is calculated and stored, or (z) the target stripe ID is to be recorded and checked to see whether or not it matches with the stripe ID recorded in the leading block of the logical-address log area 18b2.

In this manner, the data integrity of each entry may be checked.

Figure 16:
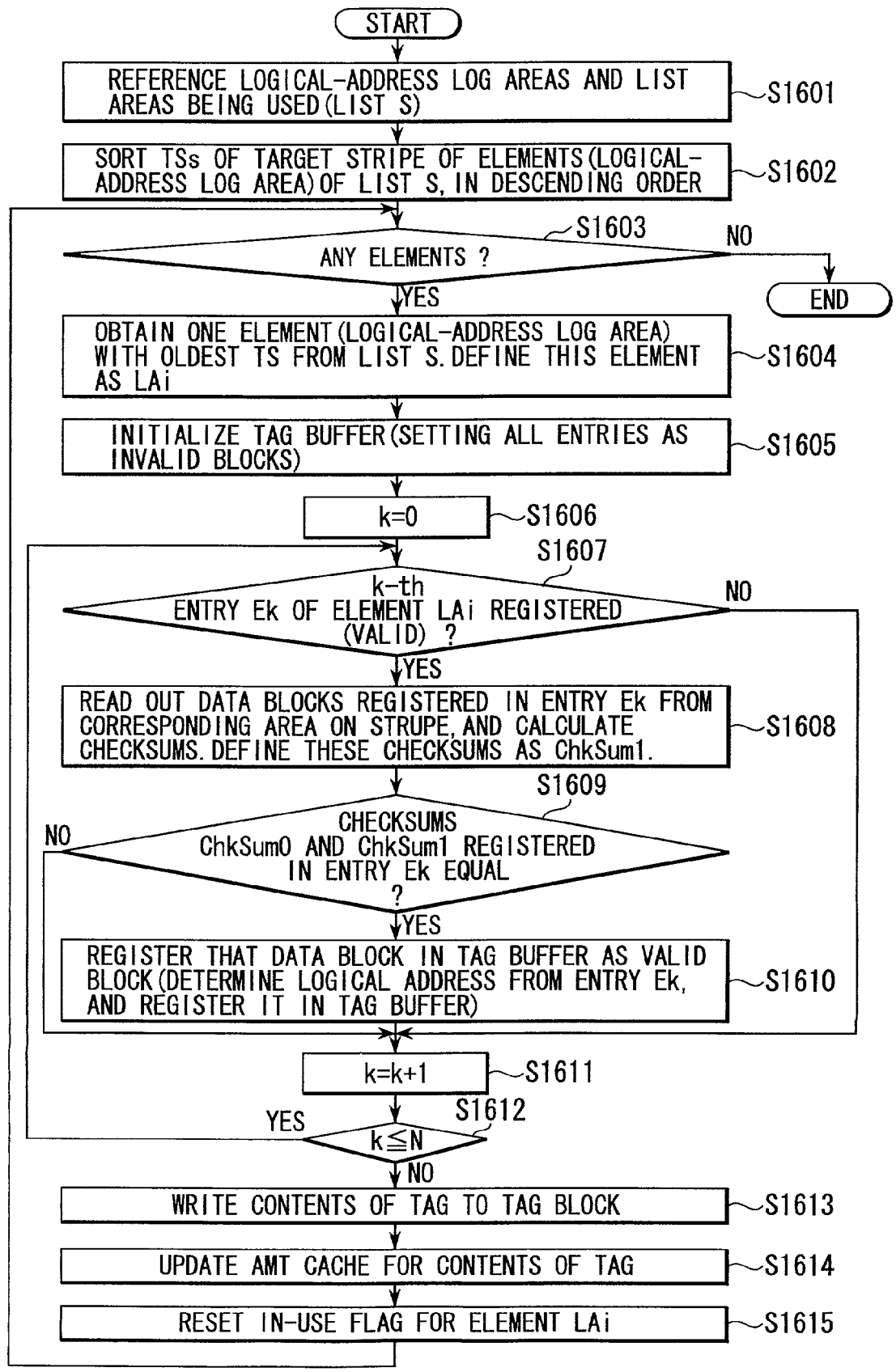
FIG. 16 is a flow chart showing a main routine for a write process according to a sixth embodiment of the present invention.

The above described process is shown in the flow chart of FIG. 16. The write method is assumed to be based on the first variation of the embodiment.

At step S1601, the logical-address log area 18b2 is referenced to check whether or not any part of the logical-address log area 18b2 is in use. Whether the logical-address log area 18b2 is in use can be determined by, for example, providing a flag (Valid) at the header of the logical-address log area 18b2, indicating that this area is in use, and setting this flag (Valid="1") while the area 18b2 is in use, and resetting it (valid="0") when the area 18b2 is to be released, as shown in FIGS. 17A to 17D. FIGS. 17A to 17D show an example in which four logical-address log areas 18b2 are provided, wherein logical address logs LA1 and LA2, having their in-use flags set (Valid="1"), can be determined to be in use. Correspondingly, LA 1 and LA 2 are recorded in an in-use List S.

Now, at step S1602, the above described list S is sorted on the basis of the value of the time stamp TS at the header section. The list is consequently sorted in a time series manner. In the example of FIGS. 17A to 17D, since the time stamp TS (=11679) of the logical-address log LA2 is smaller than that (=11680) of the logical-address log LA1 (that is, the logical-address log LA2 is older than the logical-address log LA1), the list S contains the logical-address logs LA2 and LA1 in this order as a result of the sorting at step S1602.

Then, at step S1603, it is determined that some of the logical-address log areas 18b2 (elements) are in use, and at step S1604, an element with the oldest time stamp TS is selected from the list S (the logical-address log LA2 is first selected). At step S1605, an area of the main memory 13 which is provided for a TAG image (provided in the write buffer 171) is initialized so that "all the blocks of the target data stripe are invalidated". Then, at step S1606, a variable k is set at zero. At step S1607 and subsequent steps, for each of the valid entries in the logical-address log LA2, data checksum values are read out and checked to see whether or not they are equal to the checksums actually written to the stripe. Whether or not the entry is valid may be determined as described in the above described (x) to (z).

In the example of the logical-address log LA2 in FIGS. 17A to 17D, it is assumed that entries E0, E1, E2, . . . are valid. The entry E0 is noted. The logical addresses V=463 and 464 and the checksum CS (ChkSum0=CS0 and CS1) of each data block are registered in two physical blocks relative to the header of the logical-address log. At step S1608, the first and second data blocks of the data stripe 34 (corresponding to the logical-address log LA2) are read out to determine checksums ChkSum1=CS0' and CS1'.

Figures 17A, 17B, 17C, 17D, 18:
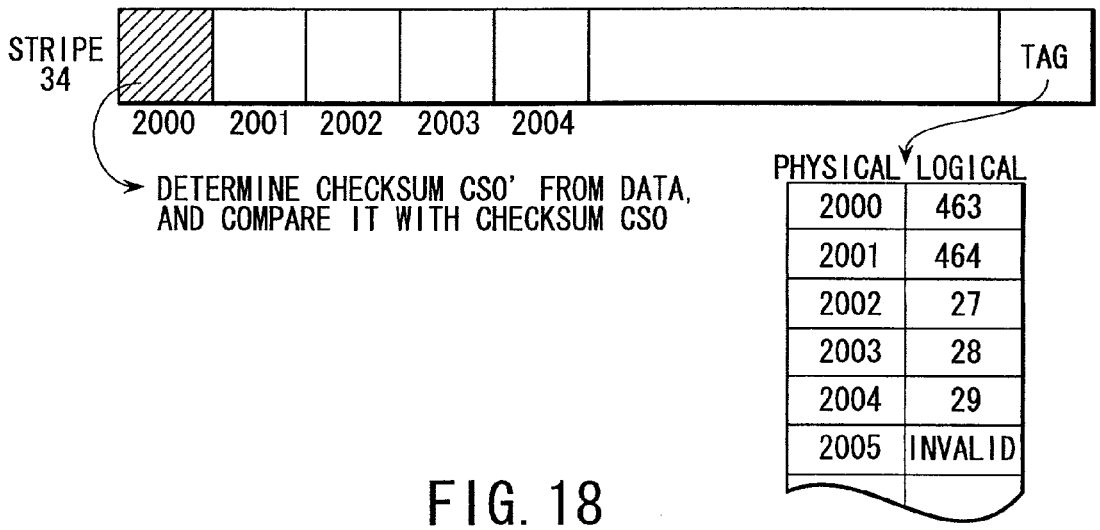
FIGS. 17A to 17D illustrate a diagram showing the organization of logical-address logs LA0 to LA3 according to the sixth embodiment of the present invention.
FIG. 18 is a diagram showing how TAG information is written to the data stripe according to the sixth embodiment of the present invention.

At step S1609, the checksums ChkSum0 are compared with the checksums ChkSum1 (CS0 with CS0' and CS1 and CS1'). If these checksums are determined to be equal, that block is determined to be correct, and at step S1610, its logical block number is registered in the TAG area of the data stripe 34. FIG. 18 shows how the TAG area appears after the five data blocks of the entries E0 and E1 have been processed. In this case, it is assumed that the physical block number of the leading block of the data stripe 34 is 2,000. Then, at step S1611, the variable k is set at k+1, and at step S1612, comparisons are made for k≦N (N is the number of data blocks constituting the data stripe).

Once the processing at steps S1607 to S1612 has been executed on all the entries of the logical-address log LA2, the TAG information is completed. Then, at steps S1613 and S1614, the TAG information is written to its original address (in the stripe 34, the last physical block), and the same contents are registered in the AMT cache 172, which is then updated. Finally, at step S1615, the flag indicating that the logical-address log LA2 is in use is reset (Valid="0"), thus completing the process of recovering the logical-address log LA2. By executing a similar process on the logical-address log LA1, the write of the logical-address logs LA1 and LA2, which was hindered by the system failure, can be completed.

The TAG is written to the TAG area in FIG. 18 by creating TAG data using the logical-address values of valid data and a logical-address value indicative of an invalid address. The invalid-logical-address value may be, for example, a value absent from that partition.

As described above, the present embodiment is based on the write method of its first variation (the data of each request are written to the target stripe), but the write method of its sixth variation (the data are first written to the logical-address log area, and then to the target stripe on the basis of the unit of the buffer WB once the buffer WB becomes full) can achieve a similar process with the following changes:

(i) At step S1608, the checksum ChkSum1 is determined from the data written to the logical-address log area 18b2.
(ii) The write data is written in the target stripe between steps S1609 and S1610.

Additional advantages and modifications will readily occur to those skilled in the art. Therefore, the invention in its broader aspects is not limited to the specific details and representative embodiments shown and described herein. Accordingly, various modifications may be made without departing from the spirit scope of the general inventive concept as defined by the appended claims and their equivalents.

What is claimed is:

1. A disk control system that responds to a write request from an upper file system to translate logical addresses into physical addresses and then continuously writes write-requested data to a data stripe functioning as a write area composed of a plurality of disk apparatuses, the system comprising:
   means for, in response to said write request, continuously writing write-requested data to the data stripe as data corresponding to physical addresses, even if the write request corresponds to discontinuous logical addresses;
   means, in response to said write request, for sequentially writing data blocks on empty areas of an assigned target data stripe of data areas provided on said plurality of disks, in such a manner that at least one data block is written at a time;
   means, in response to said write request, for writing said logical addresses from said upper file system on data managing areas provided on the plurality of disks, as logical-address log information; and
   means for notifying, in response to the write request from said upper file system, the upper file system that the write has been completed, after said data and said logical-address log information have been completely written.

2. The disk control system according to claim 1, wherein an I/O request is issued for one write request for the plurality of data blocks transferred in said write request by said upper file system, and said plurality of data blocks are simultaneously written to the empty areas of said write target data stripe.

3. The disk control system according to claim 1, wherein said logical-address log information is written on at least one logical-address log area provided in said data managing area.

4. The disk control system according to claim 3, wherein if the data managing area is composed of said plurality of logical-address log areas, one of said logical-address log areas which is not currently used and which was most recently used is used.

5. The disk control system according to claim 3, wherein said logical-address log areas are fixedly provided on said disk.

6. The disk control system according to claim 3, wherein if the system is shut down before said data write process is completed, said logical-address log information recorded in said logical-address log area is used to execute data recovery after system reboot.

7. The disk control system according to claim 1, wherein said data managing area has a stripe ID log area in which a written stripe ID and a stripe ID to be written are recorded.

8. The disk control system according to claim 1, further comprising:
   means for using a part of said write target data stripe as an area for writing tag information in; and
   means for writing logical-address information that has been written on said logical-address log area when data for all the areas of said write target data stripe have been provided, as said tag information.

9. The disk control system according to claim 8, further comprising:
   an address mapping table cache for storing correspondences between logical addresses and physical addresses relating to write data in a part of the main memory; and means for updating said address mapping table cache on the basis of said tag information, when writing of the data and the tag information on said write target data stripe is complete.

10. A disk control system that responds to a write request from an upper file system to translate logical addresses into physical addresses and then continuously writes write-requested data on a data stripe functioning as a write area composed of a plurality of disk apparatuses, the system comprising:
means for continuously writing write-requested data to the data stripe as data corresponding to physical addresses, even if the write request corresponds to discontinuous logical addresses;
means for writing a plurality of block data corresponding to a plurality of write requests, to a write buffer provided in a main memory;
data write means for responding to said plurality of write requests to simultaneously write all the plurality of data blocks stored in said write buffer on empty areas of an assigned target data stripe of data areas provided on said plurality of disks;
log write means for simultaneously writing said logical addresses from said upper file system corresponding to said plurality of block data, on data managing areas provided on said plurality of disks, as logical-address log information; and
means for notifying, with respect to the write requests from said upper file system, the upper file system that the writes have been completed, after said data and said logical-address log information have been completely written.

11. The disk control system according to claim 10, wherein the number of said write requests is managed as a variable, and if said variable is larger than a predetermined value, said write requests are retained as pending requests and a batch write process is executed using said data and said log write means, and if said variable is smaller than the predetermined value, a process of writing each of said write requests is executed.

12. The disk control system according to claim 11, wherein whether or not to execute said batch write process is determined when the number of said pending write requests exceeds a predetermined number, or the total of the data sizes of said pending requests equals or exceeds the size of a remaining empty area of said write target data stripe, or a time during which the pending requests have been kept pending exceeds a predetermined value.

13. The disk control system according to claim 10, wherein said logical-address log information is written on at least one logical-address log area provided in said data managing area.

14. The disk control system according to claim 10, wherein if the data managing area is composed of said plurality of logical-address log areas, one of said logical-address log areas which is not currently used and which was most recently used is used.

15. The disk control system according to claim 10, wherein said logical-address log areas are fixedly provided on said disk.

16. The disk control system according to claim 15, wherein if the system is shut down before said data write process is completed, said logical-address log information recorded in said logical-address log area is used to execute data recovery after system reboot.

17. The disk control system according to claim 10, wherein said data managing area has a stripe ID log area in which a written stripe ID and a stripe ID to be written are recorded.

18. The disk control system according to claim 10, wherein part of said write target data stripe is used as an area in which tag information is written, and logical-address information that has been written to said logical-address log area when data for all the areas of said write target data stripe have been provided is written as said tag information.

19. The disk control system according to claim 18, wherein an address mapping table cache that stores correspondences between logical addresses and physical addresses relating to write data is provided in part of the main memory, and when the data and the tag information have been completely written on said write target data stripe, said address mapping table cache is updated on the basis of said tag information.

20. A disk control system that responds to a write request from an upper file system to translate logical addresses into physical addresses and then continuously writes write-requested data on a data stripe as a write area composed of a plurality of disk apparatuses, the system comprising:
means for, in response to said write request, continuously writing write-requested data to the data stripe as data corresponding to physical addresses, even if the write request corresponds to discontinuous logical addresses;
means, in response to said write request for sequentially writing data blocks to empty areas of an assigned target data stripe of data areas provided on said plurality of disks, in such a manner that at least one data block is written at a time;
means, in response to said write request for writing said logical addresses from said upper file system, write data sizes, and checksums of write data to logical-address areas provided on said plurality of disks, as logical-address log information; and
means for notifying, in response to the write request from said upper file system, the upper file system that the write has been completed, after said data and said logical-address log information have been completely written.

21. The disk control system according to claim 20, wherein if the system fails during a write, it is checked whether or not a checksum value being written on said logical-address log area of a stripe being subjected to the write process equals a checksum value determined from the data written on said data area, and if these checksum values are equal, the data are treated as valid, and if these checksum values are not equal, it is determined that the data write has not been completed and the data are discarded.

22. A disk control system that responds to a write request from an upper file system to translate logical addresses into physical addresses and then continuously writes write-requested data on a data stripe as a write area composed of a plurality of disk apparatuses, the system comprising:
means for, in response to said write request, continuously writing write-requested data to the data stripe as data corresponding to physical addresses, even if the write request corresponds to discontinuous logical addresses;
means, in response to said write request, for writing said logical addresses from the upper file system, write data sizes, and checksums of data written to a logical-address log area provided on said plurality of disks, as logical-address log information;
means, in response to said write request, for sequentially writing data blocks on empty areas of an assigned target data stripe of data areas provided on the plurality of disks, in such a manner that at least one data block is written at a time; and means for notifying, in response to the write request from said upper file system, the upper file system that the write has been completed, after said logical-address log information has been completely written in the logical-address log area.

23. The disk control system according to claim 22, wherein a time required to respond to the upper file system is reduced by writing said data blocks on said logical address log area.

24. A disk control system that responds to a write request from an upper file system to translate logical addresses into physical ones and then continuously write write-requested data on a data stripe as a write area composed of a plurality of disk apparatuses, the system comprising:

means, in response to said write request, for recording flags indicative of validity or invalidity, stripe ID numbers, and write time stamps for final data in header sections of logical address log areas provided on the plurality of disks, and write time stamps for at least one block data processed by the write request, at least one logical address, and at least one checksum, to entry sections of said logical-address log areas as logical-address log information;

means, in response to said write request, for sequentially writing data blocks on empty areas of an assigned target data stripe of data areas provided on said plurality of disks, in such a manner that at least one data block is written at a time; and means, if the system fails during a write, for checking whether or not a checksum value being written on said logical-address log area of a stripe being subjected to the write process and for which a valid flag has been set equals a checksum value determined from the data written on said data area, and for treating the data as valid if these checksum values are equal, while determining that the write has not been completed and discarding the data if these checksum values are unequal.

25. The disk control system according to claim 24, wherein if said checksums are equal, a list of correspondences between physical and logical addresses is recorded in a TAG area of said data stripe, and the correspondence list in the TAG area is reflected in the address mapping table of the main memory.

26. A disk control method that responds to a write request from an upper file system to translate logical addresses into physical addresses and then continuously writes write-requested data on a data stripe as a write area composed of a plurality of disk apparatuses, the method comprising:

responding to said write request to continuously write write-requested data to the data stripe as data corresponding to physical addresses, even if the write request corresponds to discontinuous logical addresses;

responding to said write request to sequentially write data blocks on empty areas of an assigned target data stripe of data areas provided on said plurality of disks, in such a manner that at least one data block is written at a time;

responding to said write request to write said logical addresses from said upper file system on data managing areas provided on the plurality of disks, as logical-address log information; and notifying, in response to the write request from said upper file system, the upper file system that the write has been completed, after said data and said logical-address log information have been completely written.

27. A disk control method that responds to a write request from an upper file system to translate logical addresses into physical addresses and then continuously writes write-requested data on a data stripe as a write area composed of a plurality of disk apparatuses, the method comprising:

continuously writing write-requested data to the data stripe as data corresponding to physical addresses, even if the write request corresponds to discontinuous logical addresses;

writing a plurality of block data corresponding to a plurality of write requests, in a write buffer provided in a main memory;

responding to said plurality of write requests to simultaneously write all the plurality of data blocks stored in said write buffer on empty areas of an assigned target data stripe of data areas provided on said plurality of disks;

simultaneously writing all said logical addresses from said upper file system corresponding to said plurality of block data, on data managing areas provided on said plurality of disks, as logical-address log information; and notifying, with respect to the write requests from said upper file system, the upper file system that the writes have been completed, after said data and said logical-address log information have been completely written.

28. A disk control method that responds to a write request from an upper file system to translate logical addresses into physical addresses and then continuously writes write-requested data on a data stripe as a write area composed of a plurality of disk apparatuses, the method comprising:

responding to said write request to continuously write write-requested data to the data stripe as data corresponding to physical addresses, even if the write request corresponds to discontinuous logical addresses;

responding to said write request to sequentially write data blocks on empty areas of an assigned target data stripe of data areas provided on said plurality of disks, in such a manner that at least one data block is written at a time;

responding to said write request to write said logical addresses from said upper file system, write data sizes, and checksums of write data on a logical-address log area provided on said plurality of disks, as logical-address log information; and notifying, in response to the write request from said upper file system, the upper file system that the write has been completed, after said data and said logical-address log information have been completely written.

29. A disk control method that responds to a write request from an upper file system to translate logical addresses into physical ones and then continuously write write-requested data on a data stripe as a write area composed of a plurality of disk apparatuses, the method comprising:

responding to said write request to record flags indicative of validity or invalidity, stripe ID numbers, and write time stamps for final data in header sections of logical address log areas provided on the plurality of disks, and write time stamps for at least one block data processed by the write request, at least one logical address, and at least one checksum, on entry sections of said logical-address log areas as logical-address log information;

responding to said write request to sequentially write data blocks on an empty area of an assigned target data stripe of data areas provided on said plurality of disks, in such a manner that at least one data block is written at a time; and if the system fails during a write, checking whether or not a checksum value being written on said logical-address log area of a stripe being subjected to the write process and for which a valid flag has been set is equal to a checksum value determined from the data written on said data area, and treating the data as valid if these checksum values are equal, while determining that the write has not been completed and discarding the data if these checksum values are unequal.

* * * * *